(12) United States Patent
Kahng et al.

(10) Patent No.: US 9,225,639 B2
(45) Date of Patent: Dec. 29, 2015

(54) NETWORK SYSTEM

(75) Inventors: Hyun Kook Kahng, Seoul (KR); Dae In Choi, Suwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 249 days.

(21) Appl. No.: 13/982,813

(22) PCT Filed: Jan. 31, 2012

(86) PCT No.: PCT/KR2012/000765
§ 371 (c)(1),
(2), (4) Date: Jul. 31, 2013

(87) PCT Pub. No.: WO2012/105806
PCT Pub. Date: Aug. 9, 2012

(65) Prior Publication Data
US 2013/0315102 A1    Nov. 28, 2013

Related U.S. Application Data

(60) Provisional application No. 61/437,748, filed on Jan. 31, 2011.

(51) Int. Cl.
| | |
|---|---|
| *H04L 29/12* | (2006.01) |
| *H04L 12/56* | (2006.01) |
| *H04W 8/26* | (2009.01) |
| *H04W 4/02* | (2009.01) |
| *H04L 29/08* | (2006.01) |

(52) U.S. Cl.
CPC ............ *H04L 45/741* (2013.01); *H04L 61/103* (2013.01); *H04L 61/2007* (2013.01); *H04L 67/18* (2013.01); *H04W 4/02* (2013.01); *H04W 8/26* (2013.01); *H04L 61/2514* (2013.01); *H04L 61/6004* (2013.01); *H04L 61/609* (2013.01)

(58) Field of Classification Search
CPC . H04L 45/741; H04L 61/609; H04L 61/6095; H04L 61/2514; H04L 12/5865; H04L 61/2092
See application file for complete search history.

(56) References Cited

U.S. PATENT DOCUMENTS

| | | | |
|---|---|---|---|
| 6,829,230 B1 * | 12/2004 | Tiuri ................. | H04L 29/12216 370/351 |
| 6,977,929 B1 | 12/2005 | Caronni et al. | |
| 7,525,933 B1 * | 4/2009 | Hall ...................... | H04L 12/189 370/310 |
| 2002/0016858 A1 * | 2/2002 | Sawada ............. | H04L 29/12018 709/238 |

(Continued)

FOREIGN PATENT DOCUMENTS

| | | |
|---|---|---|
| CN | 1504038 A | 6/2004 |
| CN | 103053186 A | 4/2013 |

(Continued)

OTHER PUBLICATIONS

Extended European Search Report issued in Application No. EP 12 74 2068 dated Jun. 26, 2014.

(Continued)

*Primary Examiner* — Ajay Cattungal
(74) *Attorney, Agent, or Firm* — Pearne & Gordon LLP

(57) ABSTRACT

A network address generation device of a node is capable of generating a network address including a flexible address including a locator that defines location information of a point where the node is located, and a node identifier that includes identification information of the node.

9 Claims, 23 Drawing Sheets

(56) References Cited

U.S. PATENT DOCUMENTS

| | | | |
|---|---|---|---|
| 2003/0162548 A1* | 8/2003 | Kujala | G01C 21/20 455/456.1 |
| 2005/0018645 A1 | 1/2005 | Mustonen | |
| 2006/0171387 A1* | 8/2006 | Kang | H04L 29/12264 370/389 |
| 2006/0198372 A1* | 9/2006 | Lee | H04W 36/0011 370/389 |
| 2006/0234727 A1* | 10/2006 | Ashley, Jr. | G01S 5/0027 455/456.4 |
| 2007/0098010 A1* | 5/2007 | Dube | G06F 9/5044 370/463 |
| 2007/0123273 A1* | 5/2007 | Vare | H04W 4/02 455/456.1 |
| 2007/0155400 A1* | 7/2007 | Madsen | H04W 64/00 455/456.1 |
| 2007/0191022 A1* | 8/2007 | Yanagihara | H04W 64/00 455/456.1 |
| 2008/0008179 A1* | 1/2008 | Chen | H04L 61/2007 370/392 |
| 2009/0073983 A1 | 3/2009 | Kim | |
| 2010/0002700 A1 | 1/2010 | Simpson, Jr. | |
| 2010/0279776 A1* | 11/2010 | Hall | H04W 4/02 463/42 |
| 2011/0102459 A1* | 5/2011 | Hall | A63F 13/10 345/633 |
| 2011/0244798 A1* | 10/2011 | Daigle | H04L 63/08 455/41.2 |
| 2013/0157692 A1* | 6/2013 | Hall | H04L 12/1845 455/456.3 |

FOREIGN PATENT DOCUMENTS

| | | |
|---|---|---|
| JP | 2005-348218 A | 12/2005 |
| JP | 2010-512034 A | 4/2010 |
| KR | 10-2010-0073947 A | 7/2010 |
| WO | 01/13602 A1 | 2/2001 |

OTHER PUBLICATIONS

"Routing and Addressing Problems in Large Metropolitan Scale Internetworks" ISI Research Report, No. 87-180 dated Mar. 1, 1987; XP001153352.

International Search Report for PCT/KR2012/000765 dated Sep. 27, 2012.

Chinese Office action for 201280006929.4 dated Sep. 16, 2015.

* cited by examiner

| Code Identifier | Range info | Distance info | Location info |

FIG. 3B

| Code Identifier | Range info | | Distance info | | Location info |
|---|---|---|---|---|---|
| Code Identifier | Range option | Range/Unit/Scale | Distance option | Distance/Unit/Scale | Absolute Location Information |
| | | | | | Absolute Address Code |
| | Field construction identifier | | | | Relative Address Code |
| | | | | | Alias |
| | | | | | Area Code |
| | | | | | Area Code/Country Code |

FIG. 5A

| DATA | | |
|---|---|---|
| NCP: | S: NID OF SENDER | D: NID OF RECEIVER |
| LDP: | S: FLA OF SENDER | D: FLA OF LGR_S |

FIG. 5B

| DATA | | |
|---|---|---|
| NCP: | S: NID OF SENDER | D: NID OF RECEIVER |
| BDP: | S: FGA OF LGR_S | D: FGA OF LGR_R |

FIG. 5C

| DATA | | |
|---|---|---|
| NCP: | S: NID OF SENDER | D: NID OF RECEIVER |
| LDP: | S: FLA OF LGR_R | D: FLA OF RECEIVER |

FIG. 6A

| No. | NID | FLA |
|---|---|---|
| 1 | $NID_1$ | $FLA_1$ |
| 2 | $NID_2$ | $FLA_2$ |
| ... | ... | ... |

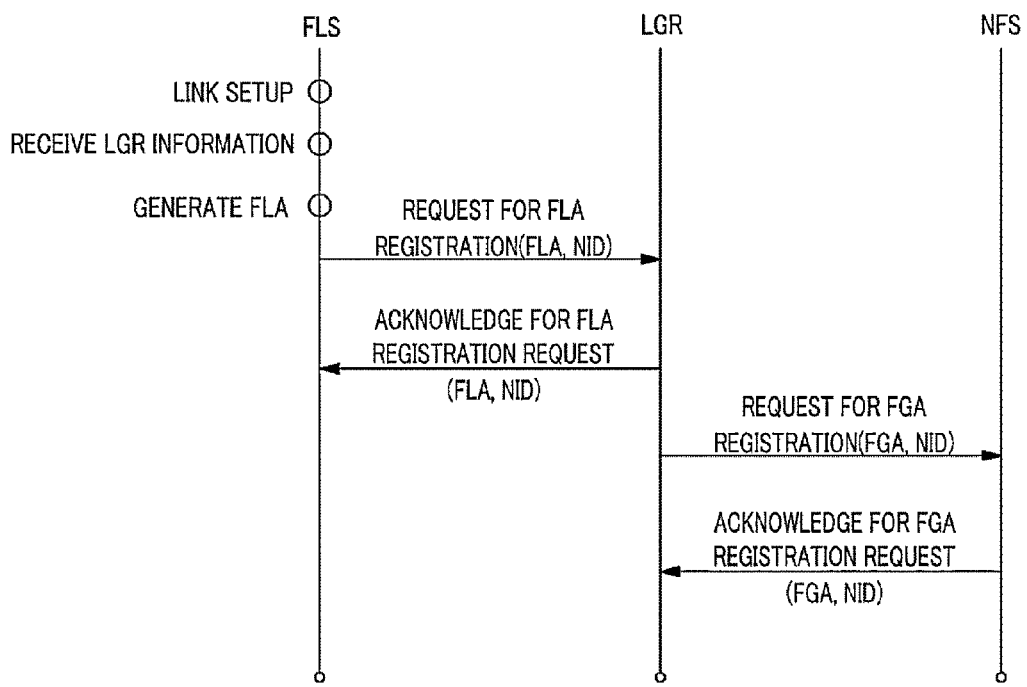

FIG. 8B

| DATA | | |
|---|---|---|
| NCP: | S: NID OF SENDER | D: NID OF RECEIVER |
| LDP: | S: FLA OF SENDER | D: FLA OF LGR_S |

FIG. 8C

| DATA | | |
|---|---|---|
| NCP: | S: NID OF SENDER | D: NID OF RECEIVER |
| BDP: | S: FGA OF LGR_S | D: FGA OF LGR_R |

FIG. 8D

| DATA | | |
|---|---|---|
| NCP: | S: NID OF SENDER | D: NID OF RECEIVER |
| LDP: | S: FLA OF LGR_R | D: FLA OF RECEIVER |

FIG. 13A

| DATA | | |
|---|---|---|
| NCP: | S: NID OF SENDER | D: NID OF RECEIVER |
| BDP: | S: FGA OF LGR_S | D: FGA OF SENDER |

FIG. 13B

| DATA | | |
|---|---|---|
| NCP: | S: NID OF SENDER | D: NID OF RECEIVER |
| LDP: | S: FLA OF LGR_S | D: FLA OF SENDER |

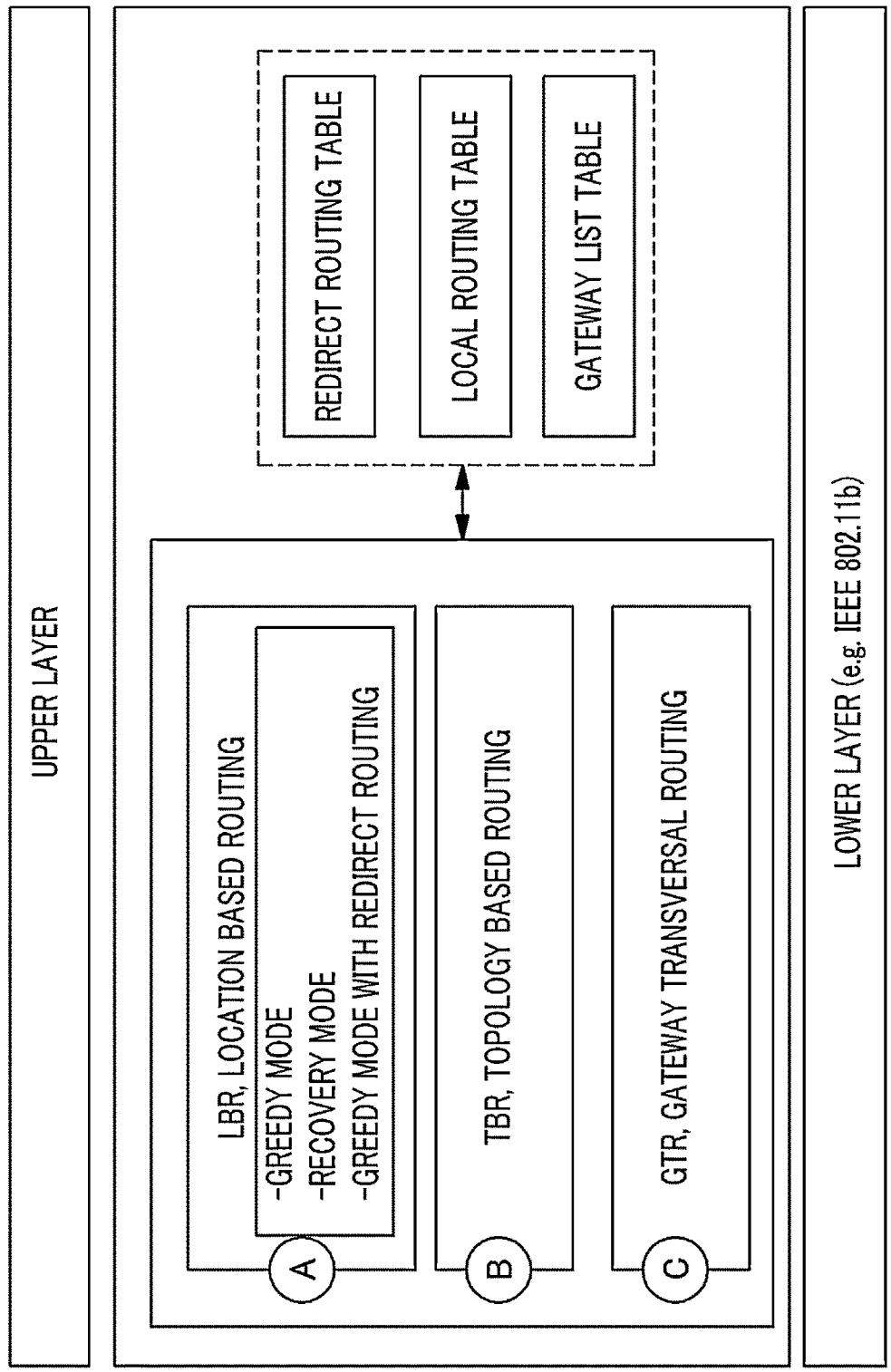

NETWORK SYSTEM

TECHNICAL FIELD

The present disclosure relates to a network system and more particularly to a network system having a new structure to be applied to future networks.

BACKGROUND ART

In recent years, as smart phones have been widely supplied, there have been issues as follows. Firstly, because of lack of existing IPv4 addresses, it is urgent to use IPv6 addresses. Secondly, current networks have been designed for fixed nods but smart phones have mobility capability, and, thus, support for mobility is needed.

Thirdly, it is typical for smart phone to support a WLAN and a cellular network at the same time, and, thus, a media independent handover needs to be supported. Fourthly, in order to transmit real-time traffic data such as audio/video through a WLAN as well as a cellular network, an end-to-end delay needs to be considered. Fifthly, considering a situation where usable power is limited, low-power communication needs to be considered.

Further, there are major problems of the current Internet: a semantic overload problem of IP address; and routing scalability. Firstly, the semantic overload problem of IP address is that a current IP address identifies "where" and "who" at the same time. Secondly, the routing scalability is that the routing tables increase due to multi-homing, traffic engineering, and non-aggregatable address allocation.

Furthermore, for ubiquitous environment, a network which is independent and can be self-organized, such as MANET, needs to be considered. As for the MANET, not only communication between internal nodes but information interchange with an external network is important, and, thus, connecting the MANET with external networks needs to be considered.

DISCLOSURE OF THE INVENTION

Problems to Be Solved by the Invention

In order to solve the above-described problems, some illustrative embodiments of the present disclosure provide a network system capable of generating and managing a new network address including location information of a node.

Means for Solving the Problems

In view of the foregoing, in accordance with a first aspect of the present disclosure, there is provided a method a network address generation device of a node capable of generating a network address including a flexible address including a locator that defines location information of a point where the node is located, and a node identifier that includes identification information of the node.

Further, in accordance with a second aspect of the present disclosure, there is provided a method a data packet transmission method of a local global router including (a) receiving, from a sending node, a data packet including a node identifier of the sending node, a node identifier of a destination node, a flexible local address of the sending node, and a flexible local address of a local global router included in the local network of the sending node, an (b) when the data packet is received, transmitting the data packet by setting a flexible global address of the local global router as the address of the sending node and a flexible global address of a local global router included in the local network including the destination node as the address of the receiving node.

Furthermore, in accordance with a third aspect of the present disclosure, there is provided a method a flexible address management method including (a) receiving, from a node included in a local network served by a local global router, a registration request message of a flexible local address including a flexible local address of the node and node identification information of the node, an (b) in response to the registration request message of a flexible local address, storing a mapping relationship between the node identification information of the node and the flexible local address of the node in a mapping table by the local global router wherein the flexible local address is generated based on a locator of the node and information of the local global router.

Moreover, in accordance with a fourth aspect of the present disclosure, there is provided a method a flexible address management method using a database system including (a) receiving, from a local global router, a registration request message of a flexible global address including a flexible global address of the local global router and node identification information of a node included in a local network of the local global router, an (b) in response to the registration request message of a flexible global address, storing a mapping relationship between the node identification information of the node and the flexible global address of the local global router in charge of the local network including the node in a mapping table by the database system.

Effect of the Invention

In accordance with the means for solving the problems of the present disclosure, it is possible to introduce a novice address system considering geographical information based on location information of a terminal. With introduction of such a new concept address system, it is possible to supply various Internet services optimized for recent terminals improved in mobility and portability.

BRIEF DESCRIPTION OF THE DRAWINGS

FIG. 2 is an explanatory diagram for explaining a structure of location information generated in accordance with an illustrative embodiment;

FIGS. 3A and 3B are explanatory diagrams for explaining a structure of a locator in accordance with an illustrative embodiment;

FIGS. 5A to 5C are explanatory diagrams for explaining a data packet transmission method in accordance with an illustrative embodiment;

FIGS. 6A and 6B are explanatory diagrams for explaining a structure of a mapping table for LOC management;

FIG. 7 is an explanatory diagram for explaining a LOC registration process of a FLA node in a network system in accordance with an illustrative embodiment;

FIGS. 8A to 8D are explanatory diagrams for explaining a process of querying of locator information in a network system in accordance with an illustrative embodiment;

FIGS. 13A and 13B are explanatory diagrams for explaining a configuration of a data transmission protocol in accordance with an illustrative embodiment;

FIG. 14 is an explanatory diagram for explaining a geographical routing method in a network system in accordance with an illustrative embodiment;

BEST MODE FOR CARRYING OUT THE INVENTION

Figure 1:
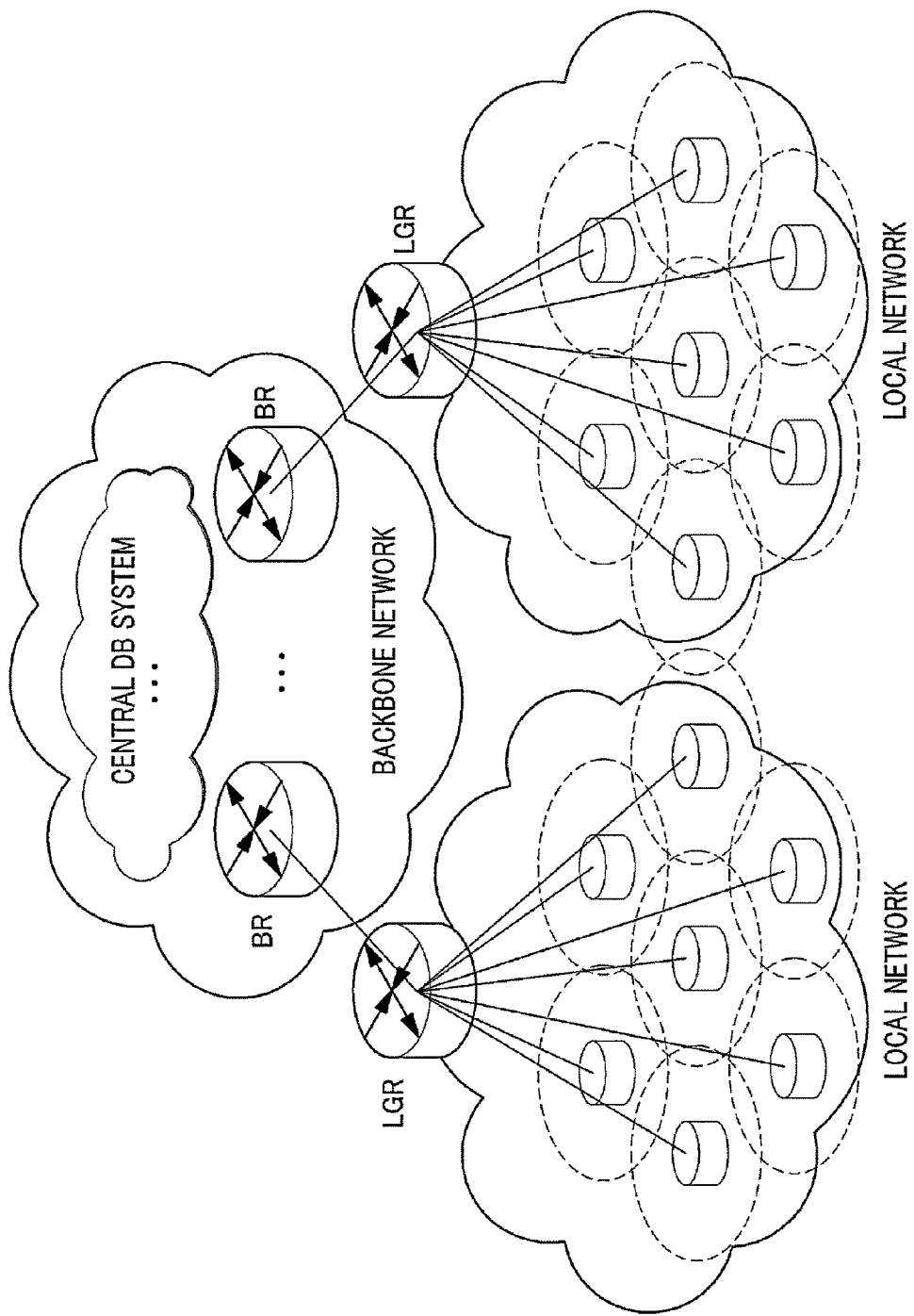
FIG. 1 is an explanatory diagram for explaining a concept of an operation of a flexible address in accordance with an illustrative embodiment.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the terms "connected to" or "coupled to" that is used to designate a connection or coupling of one element to another element includes both a case that an element is "directly connected or coupled to" another element and a case that an element is "electronically connected or coupled to" another element via still another element. Further, the terms "comprises or includes" and/or "comprising or including" used in the document means that one or more other components, steps, operation and/or existence or addition of elements are not excluded in addition to the described components, steps, operation and/or elements unless context dictates otherwise.

The terms used in the present specification are defined as follows.

A link is communication equipment or medium through which nodes communicate on a link layer. An interface represents a point of connection of a node to a link. A backbone network is existing Internet asset comprised of numerous site networks, ISPs, and network suppliers. A local network is a group of hosts and routers that share a common communication line or a wireless link. A locator (LOC) represents the location of a node in a network. An absolute locator represents latitude, longitude, and altitude of the location of a user node, and area range information from an absolute location. A relative locator is a relative distance and a range from a reference point. A flexible global address (FGA) is an address of a node in a backbone network. A flexible local address (FLA) is an address of a node in a local network. A flexible address (FA) is a flexible global address or a flexible local address. A node identifier (NID) is a globally unique identifier representing information including a user, a node, and interface. By way of example, a NID can be specified by a MAC address of a node, a serial number, information of a processor included in a node, information of a bandwidth, or the like. A FLA-FGA router (LGR) is a router located between a local network and a backbone network. A FLA router (FR) is a router located between a LGR and a node in a local network. A backbone router (BR) is a router located between LGRs in a backbone network. A NFS (NID-FA System) is a central database system including a NID and a FA. Inbound traffic is traffic from a backbone network toward a local network. Outbound traffic is traffic from a local network toward a backbone network. A FLA node is a node using a FLA.

There are roughly two methods for separating an IP address into an ID and a locator (LOC) as follows: the first method is to separate the ID and the locator into different layers. According to this method, an ID may be comprised of unique numbers, letters or symbols to identify a user or a device, and may have a hierarchical structure. The second method is to use an ID and a locator in the same layer. According to this method, an address field includes both ID information and locator information. Similarly to the current IP address system, comprised of both a network prefix and an interface ID, the address consists of an ID in a specific length and a locator.

Meanwhile, there may be needed a translation or a tunneling between a local network and a backbone network.

There are roughly four cases of using a translation as follows.

Firstly, as a one-to-one translation, an address in a local network is mapped to an address in a backbone network, which is the same method as the current NAT method.

Secondly, as a many-to-one translation, multiple addresses in a local network are mapped to an address in a backbone network, which is the same method as the current NAT-PT method.

Thirdly, as a one-to-many translation, an address in a local network is mapped to multiple addresses in a backbone network. An address of the backbone network is determined depending on a service or a function used by a node of the local network.

Fourthly, as many-to-many translation, multiple addresses in a local network are mapped to multiple addresses in a backbone network. That is, the many-to-one translation and the one-to-many translation are used at the same time.

A tunneling can be used between a local network and a backbone network. There are roughly four cases of using a tunneling as follows.

As a one-to-one tunneling, a tunneling address is used for a single address.

As many-to-one tunneling, a tunneling address is used for multiple addresses.

As one-to-many tunneling, multiple tunneling addresses are used for a single address. A tunneling address is determined depending on a service or a function used in the single address.

As many-to-many tunneling, multiple tunneling addresses are used for multiple addresses. That is, the many-to-one tunneling and the one-to-many tunneling are used at the same time.

Meanwhile, an address may include the following fields.

By way of example, an address may include an addressing type indicating what type of addressing is being used, a mobile/fixed node flag indicating whether an interface connected to a node is mobile or fixed, a backbone/local flag indicating whether an address can be used only in a local network or can also be used in a backbone network, bandwidth information indicating bandwidth information of the interface connected to the node, CPU information indicating information of CPU performance of the node, a virtual circuit flag indicating whether a virtual circuit is supported or not, information of a virtual circuit region, a virtual circuit label indicating a label used in a virtual circuit, a service type, node information indicating other distinguishing information of a node, an ID indicating an ID information that distinguishes nodes, and a locator (LOC) indicating location information of a node.

Meanwhile, there are roughly three routing methods.

A first method is a longest prefix matching method like the current Internet. This method is affected by the number of routing tables, but is the simplest method. A second method is to find an optimum route by using a locator. Either absolute or relative location information may be used. A third method is to construct a virtual circuit. A specific section of a path from the source node to the destination node can be constructed as a virtual circuit so that transmission is carried out through the predetermined route without needing to perform a path finding.

Meanwhile, for the sake of mobility, a locator of a node needs to be updated. A locator can be updated by roughly two methods: a method of using a locator update system; and a method of a node updating its locator. In the locator update system, instead of a node, a specific server or system includes LOC information of the node. This server or system may register, update, remove, and query a locator depending on a status of the node. According to the method of updating a locator by the node, if there is a change, the node informs the other side's node of its locator.

Meanwhile, in order to consume lower power, when there is a node that does not require communication, such a node should be able to consume power only when communication is needed. Therefore, by way of example, a communication standby mode needs to be supported. Further, as for a case where MTU is small, a heater compression needs to be supported.

Meanwhile, in the current Internet architecture, a control plane and a data plane share the same plane. However, such environments are vulnerable to attacks such as DDoS which may cause data packet congestion or an error in control packet transmission for a mobile node. Therefore, the control plane and the data plane need to be separated.

A flexible address structure in accordance with the present disclosure separates an IP address layer of the current TCP/IP structure into a node identifier (NID) layer and a flexible address layer.

In a local network, a flexible local address (FLA) is used, and in a backbone network, a flexible global address (FGA) is used. The flexible local address (FLA) and the flexible global address (FGA) supplies locator information of nodes.

FIG. 1 is an explanatory diagram for explaining a concept of an operation of a flexible address in accordance with an illustrative embodiment.

A communication network system depicted in FIG. 1 is divided into a local network and a backbone network. The local network includes multiple flexible routers (FRs) that perform routing based on a flexible local address, and the local network is connected to the backbone network through a local global router (LGR). The local global router (LGR) is connected between the local network and the backbone network and performs a translation between a flexible local address (FLA) and a flexible global address (FGA).

The backbone network includes multiple backbone routers (BRs) that perform routing based on a flexible global address.

The flexible router FR may be connected to one or more FLA nodes. The FLA node may generate a flexible local address by reference to information supplied from the local global route. Such a FLA node may include one or more node identifiers. Meanwhile, communication between the FLA nodes may be performed based on the node identifiers. The FLA node may perform the same function as the FLA router (FR) in a multi-hop environment such as MANET.

Figures 2, 3A:
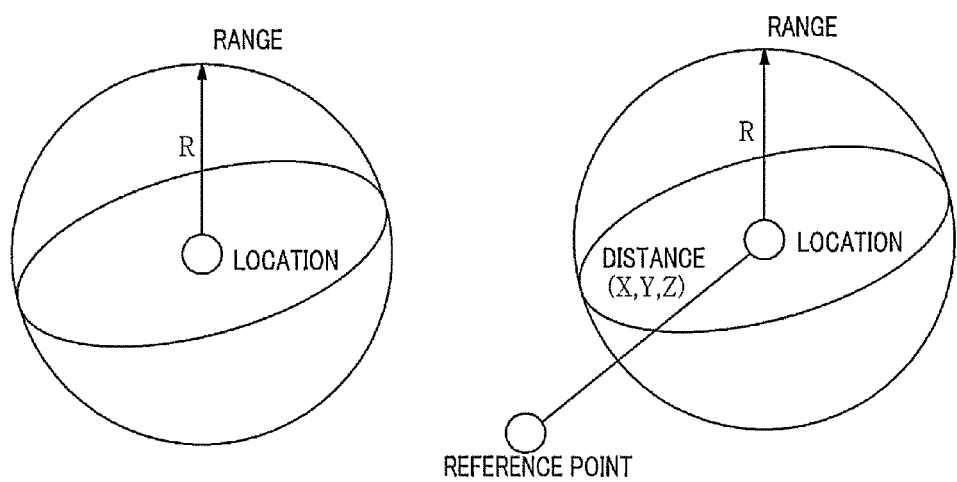

FIG. 2 is an explanatory diagram for explaining a structure of location information generated in accordance with an illustrative embodiment.

As depicted in FIG. 2, location information can be expressed by using either absolute location information, such as latitude, longitude and altitude, or relative location information such as a name like "Empire State Building" and "Golden Gate".

The location information can be expressed as either global location information or local location information. The global location information is an absolute location or a relative location using regional/national codes, whereas the local location information is relative information described by using a relative distance or an area range from a reference point.

The location information can be expressed by selectively using a reference point. The absolute location information can be expressed without a reference point, whereas the relative location information can be expressed by using a direction, a distance or the like from a specific reference point.

FIGS. 3A and 3B are explanatory diagrams for explaining a structure of a locator in accordance with an illustrative embodiment.

The locator may include a code identifier field, a range information field, a distance information field, and a location information field. That is, the locator can represent specific location information and can also represent a surrounding area of the specific location by using area information. Further, the locator can represent a relative location away as far as a specific distance from a specific location.

The code identifier field includes information for identifying a format and a kind of a locator. That is, a locator can be expressed in an ASCII format, a binary format or a user-defined format. Further, a code identifier identifies a kind of location information defined by a location information field. By way of example, the code identifier identifies location information expressed by the location information field as either absolute location information or relative location information. Range information and distance information may vary depending on information of the code identifier field.

The range information field indicates an area with a point expressed by the location information field as a center. The range information can be used in various ways, for example, to detect a range of a node, coverage of a node or an error area. The range information field includes a range, a unit, a scale, and the like. The unit may be kilometer (km), meter (m), or the like. The range information field may be selectively not used.

The distance information field is used to express a relative position from a point included in the location information field. That is, a final location may be a location spaced as much as the distance information from a reference point included in the location information field. The distance information field may be selectively not used.

The location information field may include a reference point of either the absolute location information or the relative location information. The absolute location information can be determined by latitude, longitude, altitude, and the like, and the relative location information can be expressed in the form of a relative location from a reference point. The code identifier field may be used to identify the type of location information described in the location information field.

As depicted in FIG. 3B, the locator may use a hierarchical structure.

The node identifier is a globally unique identifier of a FLA node, and a node identifier of every node can be identified in advance.

A flexible local address (FLA) is an address of a FLA node used in a local network. Each interface of the FLA node has a flexible local address. The FLA node may generate a FLA by reference to information supplied from a FLA-FGA router (LGR). The FLA can be used as information for routing in a local network. The FLA can be used as information for generating a virtual circuit. A network prefix may include a hierarchical locator.

The FLA may include fields such as an addressing type indicating which type of addressing is being used, a mobile/fixed node flag indicating whether an interface to which a node is connected is mobile or fixed, a backbone/local flag indicating whether an address can be used only in a local network or can also be used in a backbone network, bandwidth information indicating bandwidth information of an interface to which a node is connected, CPU information indicating information of CPU performance of a node, a virtual circuit flag indicating whether a virtual circuit is supported or not, information of a virtual circuit region, a virtual circuit label indicating a label used in a virtual circuit, a service type, node information indicating other distinguishing information of a node, an ID distinguishing a node from other nodes, and a locator (LOC) indicating hierarchical location information of a node.

A flexible global address (FGA) is an address used in a backbone network and is an address of the LGR. The flexible global address may be constructed manually or automatically so as to be used globally and uniquely. The flexible global address can be used as information for routing in a network. The flexible global address can be used as information for generating a virtual circuit. A network prefix may include a hierarchical locator.

The FGA may include fields such as an addressing type indicating which type of addressing is being used, a mobile/fixed node flag indicating whether an interface to which a node is connected is mobile or fixed, a backbone/local flag indicating whether an address can be used only in a local network or can also be used in a backbone network, bandwidth information indicating bandwidth information of an interface to which a node is connected, CPU information indicating information of CPU performance of a node, a virtual circuit flag indicating whether a virtual circuit is supported or not, information of a virtual circuit region, a virtual circuit label indicating a label used in a virtual circuit, a service type, node information indicating other distinguishing information of a node, an ID distinguishing a node from other nodes, and a locator (LOC) indicating hierarchical location information of a node.

A flexible router (FAS router, FR) is a router that determines a route by using a FLA in a local network and may have a hierarchical structure. A backbone router (BR) can determine a route by using a FGA in a backbone network and may have a hierarchical structure.

A FLA node may include one or more NIDs. Communication between the FLA nodes may be performed through the NIDs. The FLA node may perform the same function as the FR in a multi-hop environment such as MANET.

The LGR is positioned between a local network and a backbone network and performs a translation between a FLA and a FGA. The LGR includes one or more interfaces with respect to a local network and one or more interfaces with respect to a backbone network and may have a hierarchical structure. For data transmission of outbound traffic, the LGR translates a FLA into a FGA, uses its FGA as the FGA source address, and uses a lookup result performed with a destination NID as the FGA destination address.

For data transmission of outbound traffic, the LGR translates a FGA into a FLA, uses its FLA as the FLA source address, and uses a lookup result performed with a destination NID as the FLA destination address.

The LGR translates a LLMP of a packet received from a FLA node into a GLMP and transmits the GLMP. By way of example, the LGR translates a LLMP type packet such as a LRR into a GLMP type packet such as a GRR. The LGR translates a GLMP received from a NFS into a LLMP and transmits the LLMP. By way of example, the LGR translates a GLMP type packet such as a GRA into a LLMP type packet such as a LRA.

For communication between FLA nodes, the LGR maintains and manages a NID-FLA mapping table of local network nodes, a NID-FGA mapping table of backbone network nodes, and list information of inner nodes and their corresponding counterparts.

A NID-FGA system (NFS) is a database system storing information of the NIDs and FGAs. The NFS processes a GLMP transmitted from a LGR and makes a response thereto. The NFS may have a hierarchical structure. In a database of the NFS, information like NIDs and FGAs is maintained and managed.

Figure 4:
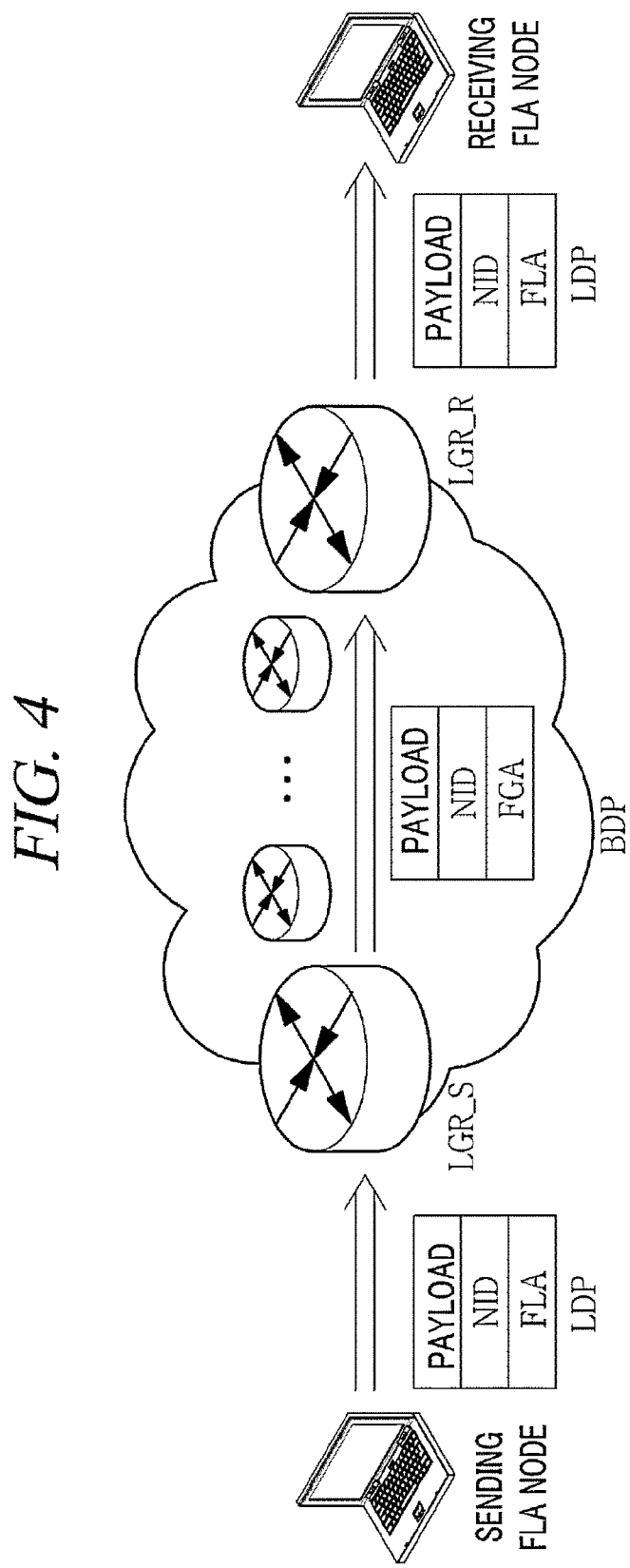
FIG. 4 is an explanatory diagram for explaining a data packet transmission method in accordance with an illustrative embodiment.

FIG. 4 is an explanatory diagram for explaining a data packet transmission method in accordance with an illustrative embodiment.

A data packet transmitted from a sending FLA node (sender) to a receiving FLA node (receiver) is delivered through the following steps. The sending FLA node transmits the data packet to a sending LGR (LGR_S). Since the sending FLA and the sending LGR (LGR_S) are in a local network, a local delivery protocol (LDP) is used. The sending LGR (LGR_S), on receiving the packet, translates the LDP into a backbone delivery protocol (BDP). Then, the sending LGR (LGR_S) transmits the data packet to a receiving LGR (LGR_R) by using the BDP. Since the sending LGR and the receiving LGR are in a backbone network, the BDP is used. The receiving LGR, on receiving the packet, translates the BDP into the LDP. Then, the receiving LGR transmits the data packet to the receiving FLA node by using the LDP.

FIGS. 5A to 5C are explanatory diagrams for explaining a data packet transmission method in accordance with an illustrative embodiment As depicted in FIG. 5A, the sending FLA node generates a data packet to transmit to the receiving FLA node. By way of example, as the NID source, the sending FLA node uses its NID, and as the NID destination, the sending FLA node uses the NID of the receiver. For LDP source FLA, it uses its FLA, and for LDP destination FLA, it uses the FLA of the sending LGR (LGR_S).

A structure of the data packet transmitted from the sending FLA node to the sending LGR (LGR_S) is as shown in FIG. 5A. That is, in a local network depicted in FIG. 4, routing between the sending FLA node and the sending LGR (LGR_S) is performed by using FLAs. Details thereof will be explained later.

FIG. 5B illustrates a data packet transmission process between a sending LGR (LGR_S) and a receiving LGR (LGR_R). That is, the sending LGR (LGR_S) that receives the data packet shown in FIG. 5A from the local network translates the data packet as follows and transmits the translated data packet to the backbone network.

For the NID, the NID of the sending FLA is used without a change, and for the NID destination, the NID of the received FLA is used. The LDP FLA is translated into the BDP FGA. For the BDP source, the FGA of the sending LGR (LGR_S) is used, and for the BDP destination, the FGA of the receiving LGR (LGR_R) is used. A structure of the data packet transmitted from the sending LGR (LGR_S) to the receiving LGR (LGR_R) is as shown in FIG. 5B. That is, in a backbone network depicted in FIG. 4, routing is performed between the LGRs by using FGAs. Details thereof will be explained later.

FIG. 5C illustrates a data packet transmission process between the receiving LGR (LGR_R) and the receiving FLA node. That is, the receiving LGR (LGR_R) that receives the data packet depicted in FIG. 5B from the backbone network translates the data packet as follows and transmits the translated data packet to the local network.

For the NID, the NID of the sending FLA is used without a change, and for the NID destination, the NID of the receiving FLA is used. The BDP FGA is translated into a LDP FLA. For the LDP source, the FLA of the receiving LGR (LGR_R) is used, and for the LDP destination, the FLA of the receiving FLA is used. A structure of the data packet transmitted from the receiving LGR (LGR_R) to the receiving FLA node is as shown in FIG. 5C.

That is, in the local network depicted in FIG. 4, routing is performed between the receiving LGR (LGR_R) and the receiving FLA node by using FLAs. Details thereof will be explained later.

Hereinafter, there will be explained a management method of a locator in a network system in accordance with an illustrative embodiment of the present inventive concept.

A FLA used in a local network and a FGA used in a backbone network respectively include locators (LOCs). Therefore, a LGR maintains and manages a NID-FLA mapping table for LOC management with respect to a FLA node of the local network, and caches a NID-FGA mapping table for LOC management with respect to a corresponding FLA node. A NFS includes NID-FGA mapping table information of all FLA nodes and maintains and manages this information.

A LLMP is used to manage a LOC between the FLA node and the LGR. The FLA node uses the LLMP to register the FLA. A GLMP is used to manage a LOC between the LGR and the NFS. The LGR uses the GLMP to register the FGA. Between the FLA node and the NFS, the LGR performs a translation between the LLMP and the GLMP. The LGR uses the GLMP for the sake of mobility of the FLA node.

FIGS. 6A and 6B are explanatory diagrams for explaining a structure of a mapping table for LOC management.

A NID-FLA mapping table depicted in FIG. 6A is used to manage FLA information of FLA nodes in a local network. The NID-FLA mapping table includes information of mapping relationships between NIDs and FLAs. A LGR maintains and manages the NID-FLA mapping table with respect to FLA nodes. The LGR may include a NID-FLA mapping table with respect to all the FLA nodes in the same local network.

A NID-FGA mapping table depicted in FIG. 6B is used to manage FGA information of FLA nodes in a backbone network. The NID-FGA mapping table includes information of mapping relationships between NIDs and FGAs. LGR caches a NID-FLA mapping table with respect to FLA nodes in the local network and their corresponding communication counterparts. A NFS maintains and manages a NID-FGA mapping table in accordance with a GLMP from the LGR. The NFS includes a NID-FGA mapping table of all FLA nodes.

FIG. 7 is an explanatory diagram for explaining a LOC registration process of a FLA node in a network system in accordance with an illustrative embodiment.

A FLA node sets up an interface link, and after this process is completed, the FLA node receives LGR information.

Then, the FLA node generates a FLA based on its LOC information and the LGR information.

Thereafter, the FLA node makes a request for registration of the FLA to the LGR. This request includes the FLA and the NID.

Subsequently, in response to the request, the LGR transmits an acknowledge message informing the FLA node that the registration of the FLA is completed.

Then, the LGR makes a request for registration of a FGA to a NFS. This request includes NID information of the FLA node and the FGA of the LGR.

Thereafter, the NFS transmits an acknowledge message informing the LGR that the registration of the FGA is completed.

FIGS. 8A to 8D are explanatory diagrams for explaining a process of querying of locator information in a network system in accordance with an illustrative embodiment.

Figure 8A:
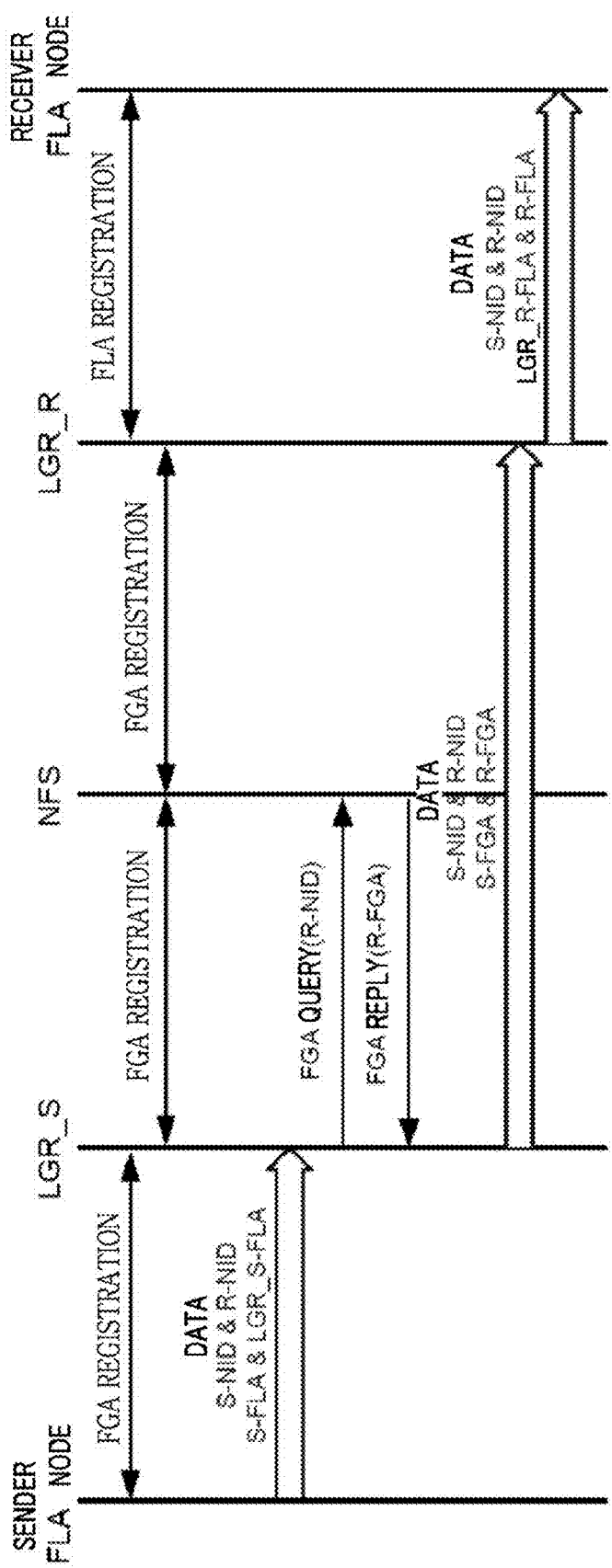

As depicted in FIG. 8A, the sending FLA node and the receiving FLA node register their FLAs at their corresponding LGRs (i.e., LGR_S and LGR_R), respectively. The sending LGR (LGR_S) and the receiving LGR (LGR_R) registers the FGAs of the nodes, respectively.

Then, the sending FLA node transmits a data packet depicted in FIG. 8B to the receiving FLA node. The sending LGR (LGR_S), on receiving the data packet, searches a cached NID-FGA mapping table with the NID of the receiver. If the corresponding FGA is not present in the table, the sending LGR (LGR_S) transmits a FGA query including the NID of the receiving FLA node to the NFS. In response to this query, the NFS searches the NID of the receiving FLA node and a FGA corresponding thereto, and returns the search result to the sending LGR (LGR_S).

The sending LGR (LGR_S) matches the FGA received from the NFS to the NID of the receiving FLA node and updates the NID-FGA mapping table.

The sending LGR (LGR_S) translates the FLA into the FGA and transmits the data packet to the receiving LGR (LGR_R). A structure of the transmitted data packet is as shown in FIG. 8C.

Then, the receiving LGR (LGR_R) that receives the data packet shown in FIG. 8C matches the NID of the sender with the FGA of the sender and updates the NID-FGA mapping table. If the corresponding FGA is not present in the mapping table, the receiving LGR (LGR_R) transmits a FGA query including the NID of the receiver to the NFS. The receiving LGR (LGR_R) translates the FGA into the FLA and transmits the data packet shown in FIG. 8D.

Meanwhile, the network system in accordance with the present disclosure offers a routing method for a FLA node that has mobility.

Figure 9:
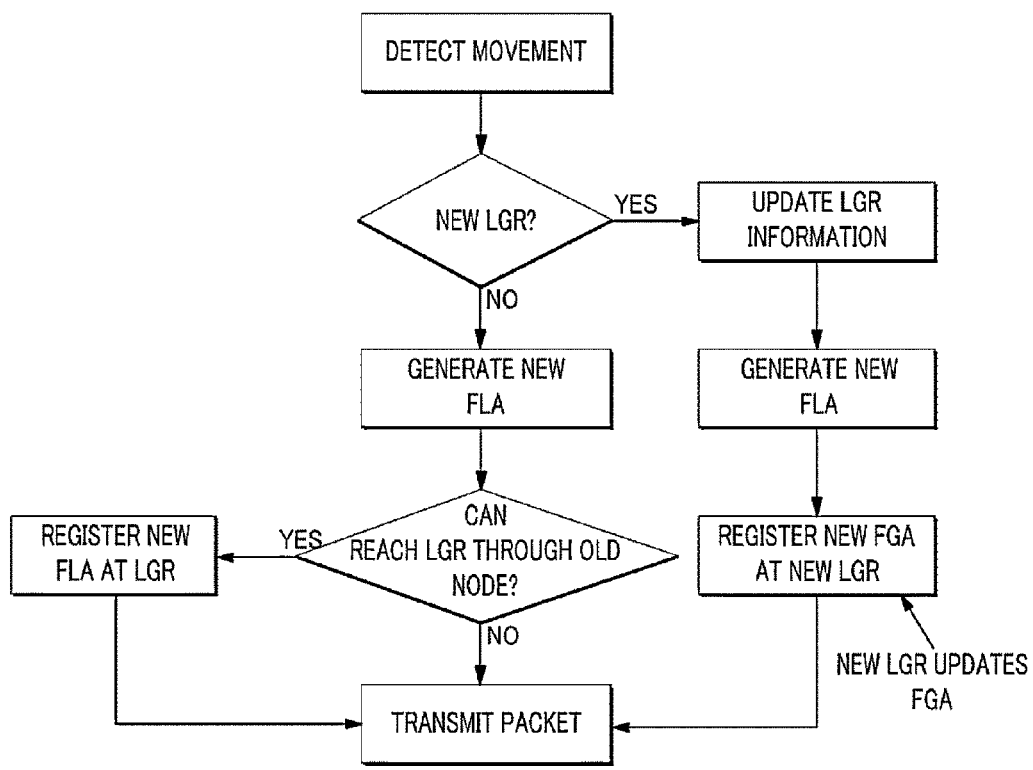
FIG. 9 is an explanatory diagram for explaining a moving process of a FLA node in accordance with an illustrative embodiment.

FIG. 9 is an explanatory diagram for explaining a moving process of a FLA node in accordance with an illustrative embodiment.

As depicted in FIG. 9, two kinds of moving processes may be performed depending on whether or not a movement-detected node moves within the same LGR range. That is, a FLA node may move in roughly two ways.

Firstly, the FLA node may move in the same local global router range. In this case, since the location of the FLA node is changed, a new locator is generated and the flexible local address is changed accordingly. However, since the FLA node is present in the same local global router, the flexible global address is not changed.

Figure 10:
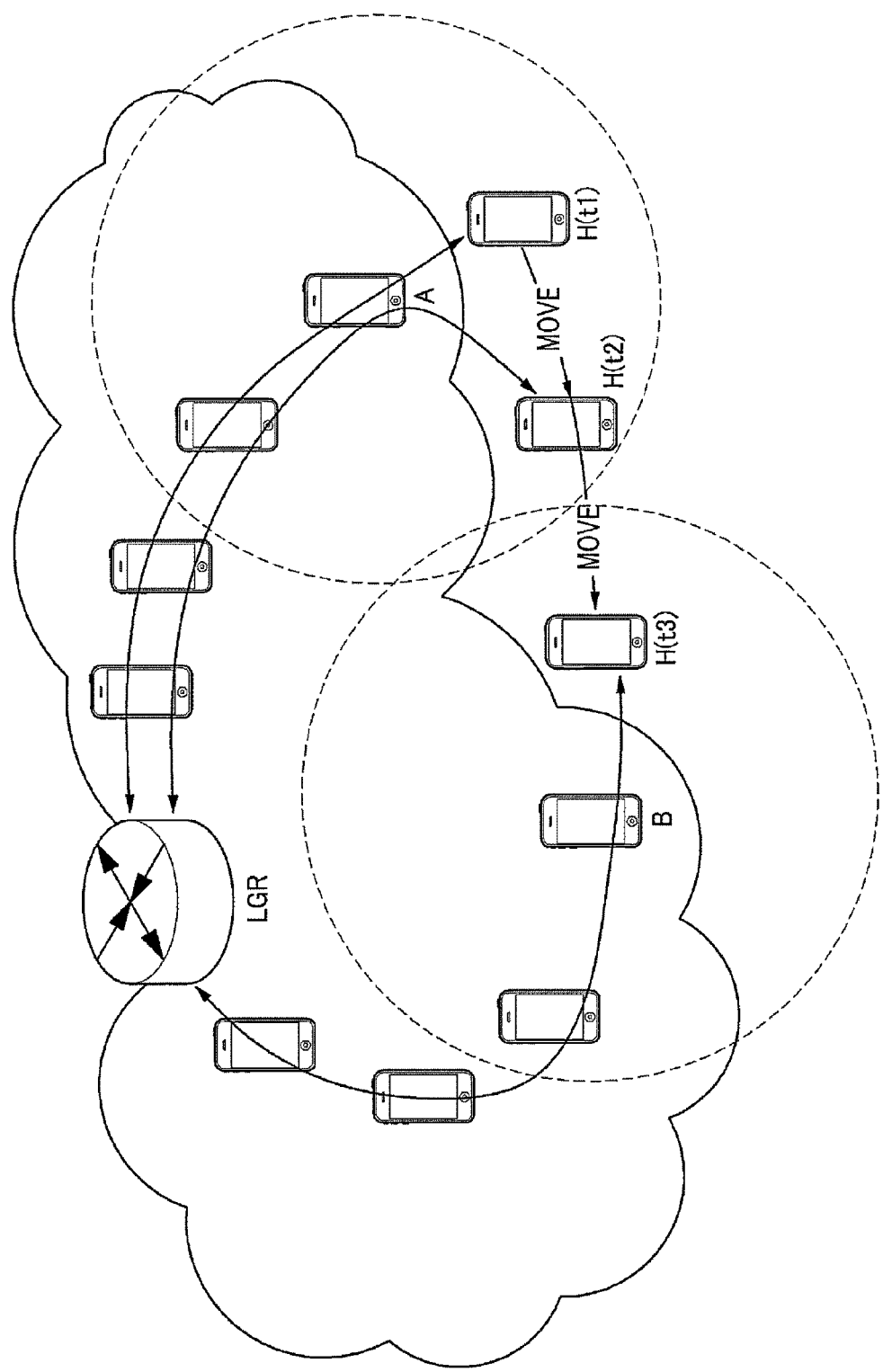
FIG. 10 is an explanatory diagram for explaining a routing method upon a change of location of a FLA node in a network system in accordance with an illustrative embodiment.

FIG. 10 is an explanatory diagram for explaining a routing method depending on a change in a location of a FLA node in a network system in accordance with an illustrative embodiment.

FIG. 10 illustrates a routing method when the location of a node is changed within the same router service range.

By way of example, as depicted in FIG. 10, let's assume the network is a multi-hop network such as a MANET, and a FLA node (H) communicates with a LGR through another FLA node A at a first time point t1. The FLA node (H) moves at a second time point t2 and, accordingly, the FLA node (H) generates a FLA with a new locator. However, since the FLA node (H) is located within a certain distance from the FLA node (A) and thus can perform communication through the FLA node (A), the FLA node (H) may not inform the LGR of the new FLA.

Then, when the FLA node (H) moves to a new location at a third time point t3, the FLA node (H) generates a FLA with a new locator in the same manner. In this case, the FLA node (H) is located out of a certain distance from the FLA node (A). Therefore the FLA node (H) can communication with the LGR through a new FLA node (B). In order to do so, the FLA node (H) transmits the new FLA to the LGR.

Secondly, the FLA node may move into the service range of a different LGR. In this case, the FGA is also changed as well as the FLA.

Figure 11:
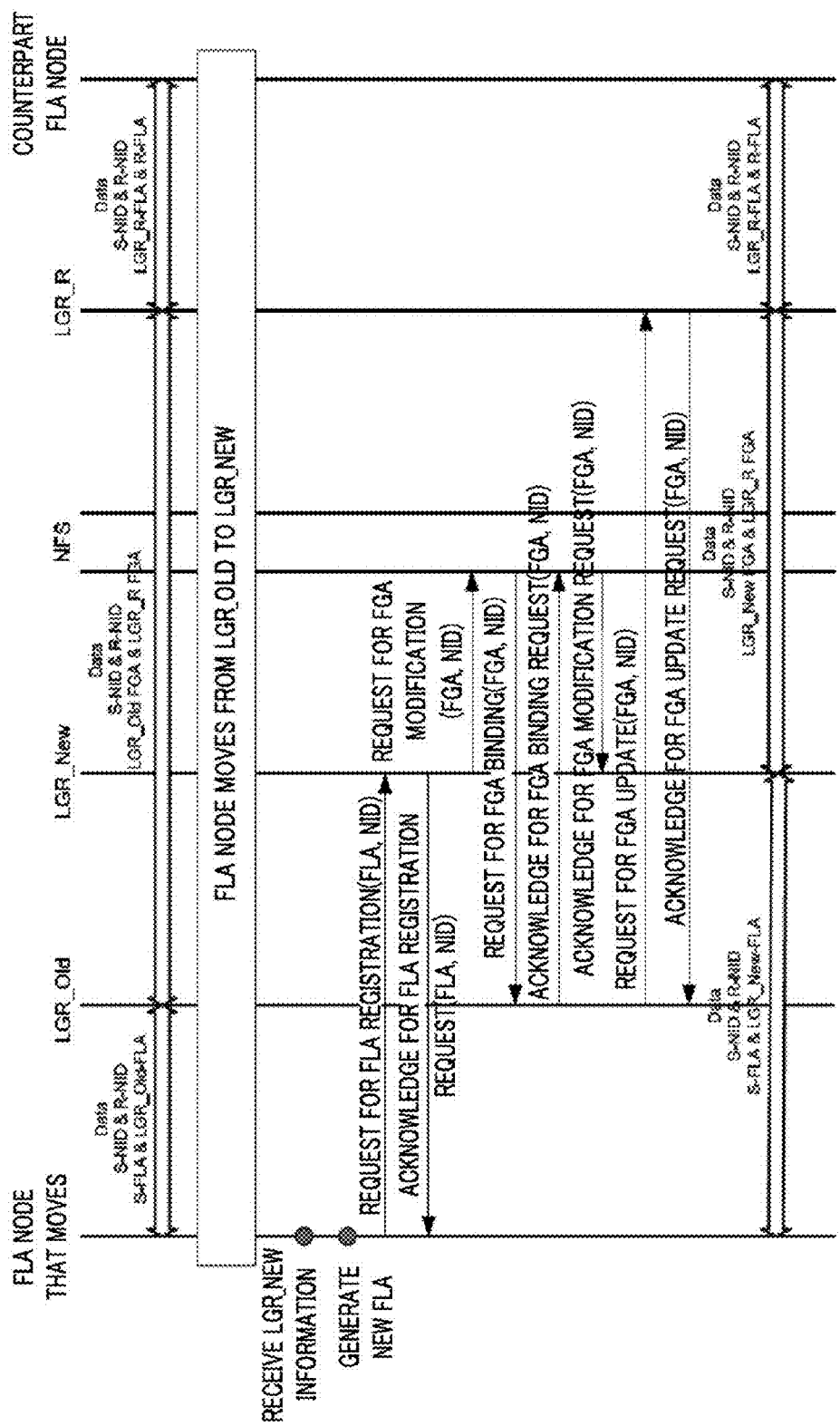
FIG. 11 is an explanatory diagram for explaining a method for changing a router upon a change in location of a node in a network system in accordance with an illustrative embodiment.

FIG. 11 is an explanatory diagram for explaining a method for changing a router depending on a change in a location of a node in a network system in accordance with an illustrative embodiment.

While a FLA node communicates with a corresponding FLA node through an old LGR (LGR_Old), due to the change in the location of the FLA node, the FLA node moves into the network serviced by a new LGR (LGR_New). Accordingly, the FLA node sets up the interface link and receives information of the new LGR (LGR_New). Further, the FLA node generates locator information generated with respect to the new location of the FLA node and a new FLA with respect to the information of the new LGR (LGR_New).

Then, the FLA node registers the new FLA at the new LGR (LGR_New). The FLA node may transmit the FLA and the NID to register its locator. Thereafter, the new LGR (LGR_New) registers the new FLA of the FLA node.

Subsequently, as the servicing LGR has been changed due to the move of the FLA node, the NFS is informed of such a change. That is, the new LGR (LGR_New) transmits a request for FGA modification to the NFS with the FGA and the node identifier of the moved FLA node. The NFS that receives the request searches a NID-FGA mapping table based on the NID of the location-changed FLA node and find the old LGR (LGR_Old) that was in charge of the FLA node before the location of the FLA node was changed. Then, the NFS transmits a request for FGA binding including the NID and FGA information of the location-changed FLA node to the old LGR (LGR_Old).

When receiving this request, the old LGR (LGR Old) updates its NID-FGA mapping table and transmits an acknowledge message for the FGA binding request. The NFS that receives the message transmits a FGA acknowledge message to the new LGR (LGR_New).

Meanwhile, the old LGR (LGR_Old) that receives the FGA binding message searches a list of corresponding FLA nodes that are communicating with the location-changed FLA node, and according to the search result, transmits requests for update of a flexible global address to the routers LGR_R in charge of those corresponding FLA nodes with the NID and the flexible global address of the location-changed FLA node.

The router LGR_R that receives the request for update of a flexible global address updates its NID-FGA mapping table and then transmits an acknowledge message informing that the update is completed to the old router (LGR_Old).

Before the flexible global address is updated, the old router (LGR_Old) transmits a data packet to the new router (LGR_New) by using a tunneling.

Hereinafter, there will be explained routing methods in a network system in accordance with an illustrative embodiment of the present inventive concept.

A flexible router (FR) in charge of a local network and a FLA node can generate and use a virtual circuit by using FLAs. A backbone router (BR) in charge of a backbone network can generate and use a virtual circuit by using FGAs. With these virtual circuits, a QoS can be guaranteed and a low delay and a traffic management feature can be obtained.

Flexible global address routing determines routing paths between local global routers. Based on the addressing type of the flexible global address, one of the following routing methods can be used:

Firstly, a LPM (longest prefix match) method may be used for the flexible global address system in accordance with IP routing methods like the conventional Internet. Secondly, a routing method using information of the locator of the flexible global address may be used. Thirdly, a method of configuring a virtual circuit using a virtual circuit labels may be used.

Flexible global address routing may determine routing paths between local global routers, between a backbone router BR and a local global router, or between backbone routers.

When generating a virtual circuit, the local global router may use flexible global address information and route information.

The flexible global address information may include the mobile/fixed node flag, bandwidth information, CPU information, and node information of the flexible global address. The route information may include the number of hops in the route, the bandwidth, the link state, the delay status, and the load status of the route.

A virtual circuit may use more than one flexible global addresses together. Also, a single flexible global address may be used for multiple virtual circuits. What kind of virtual circuit will be used can be determined by the services, traffic, and delays.

Meanwhile, Flexible local address routing may determine routing paths between a local global router and a FLA node. Based on the addressing type of the flexible local address, one of the following routing methods can be used:

Firstly, a LPM (longest prefix match) method may be used for the flexible local address system in accordance with IP routing methods like the conventional Internet. Secondly, a routing method using information of the locator of the flexible local address may be used. Thirdly, a method of configuring a virtual circuit using a virtual circuit labels may be used.

Flexible local address routing may determine routing paths between local global routers, between a local global router and a FLA node, between FLA node routers FRs, between a FLA node router FR and a FLA node, and between FLA nodes.

When generating a virtual circuit, the local global router, the FLA node router, and the FLA node can use flexible local address information, route information, and node status information.

The flexible local address information may include the mobile/fixed node flag, bandwidth information, CPU information, and node information of the flexible global address. The route information may include the number of hops in the route, the bandwidth, the link state, the delay status, and the load status of the route. The node status information may include the signal intensity of the interface, the distance from a neighboring node, and battery status information.

A virtual circuit may use more than one flexible local addresses together. Also, a single flexible local address may be used via multiple virtual circuits. What kind of virtual circuit will be used can be determined by the services, traffic, and delays.

Hereinafter, there will be explained protocols in a network system in accordance with an illustrative embodiment.

Location management protocols (LMP) are classified into a global location management protocol (GLMP) and a local location management protocol (LLMP).

The GLMP is used between LGRs or between a LGR and a NFS in a backbone network. The GLMP is used to maintain and manage a FGA of a FLA and to query a FGA using a NID (NID-to-FGA query).

By way of example, a request for registration of a flexible global address (FGA Register REQ or GRR) is transmitted by a LGR to register the NID of a new FLA node at a NFS. An acknowledgement message for the request (FGA Register ACK) is transmitted from the NFS to the LGR in response to the GRR. A request for translation of a flexible global address (FGA Transfer REQ or GTR) is transmitted by a new LGR to inform the NFS of a movement of the FLA node. An acknowledgement message for the request (FGA Transfer ACK) is transmitted from the NFS to the new LGR in response to the GTR. A request for binding of a flexible global address (FGA Binding REQ or GBR) is transmitted by the NFS to inform the old LGR of the movement of the FLA node. An acknowledgement message for the request (FGA Binding ACK) is transmitted from the old LGR to the NFS in response to the GBR. A request for update of a flexible global address (FGA Update REQ) is transmitted by the old LGR to inform a LGR of a CN of the movement of the FLA node. An acknowledgement message for the request (FGA Update ACK) is transmitted from the LGR of the CN to the old LGR in response to the request for update of a flexible global address. A flexible global address query message (FGA Query) is transmitted by the LGR to query to the NFS a FGA with a NID. A flexible global address reply message GLA (FGA Reply) is transmitted from the NFS to the LGR in response to the flexible global address query message.

The LLMP is used between a FLA node and a LGR in a local network. The LLMP is used to maintain and manage a FLA of a FLA node.

By way of example, a request for registration of a flexible local address (FLA Register REQ) is transmitted by a FLA node to register a FLA of the FLA node at a LGR. An acknowledgement message for the request (FLA Register ACK) is transmitted from the LGR to the FLA node in response to the request for registration of a flexible local address.

Figure 12:
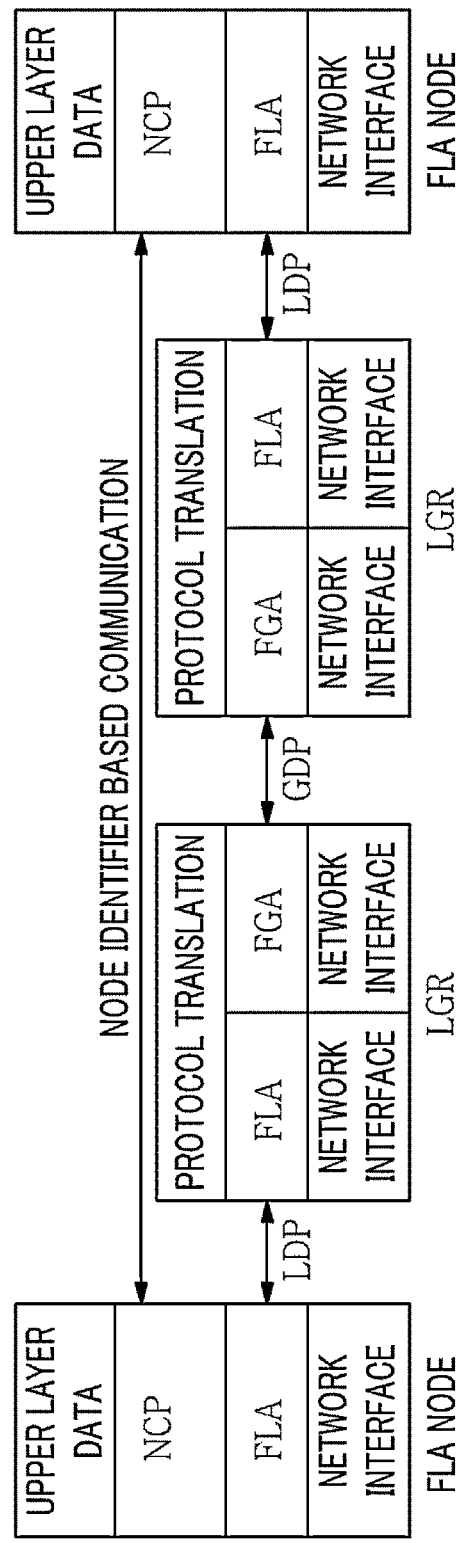
FIG. 12 is an explanatory diagram for explaining a configuration of a NCP in accordance with an illustrative embodiment.

FIG. 12 is an explanatory diagram for explaining a configuration of a NCP in accordance with an illustrative embodiment.

A NCP (NID Communication Protocol) is used for end-to-end communications between FLA end nodes and uses NIDs.

Data delivery protocols are classified into a BDP and a LDP.

FIGS. 13A and 13B are explanatory diagrams for explaining a configuration of a data transmission protocol in accordance with an illustrative embodiment.

A BDP (Backbone Delivery Protocol) depicted in FIG. 13A is used to deliver a data packet between LGRs in a backbone network. A BDP header includes a sender (source FGA) and a receiver (destination FGA). The packet between the LGRs uses FGAs: for the sender, the FGA of the LGR in the sender's network, and for the receiver, the FGA of the LGR in the receiver's are used.

A LDP (Local Delivery Protocol) depicted in FIG. 13B is used to deliver a data packet between a FLA node and a LGR in a local network. A LDP header includes a sender (source FLA) and a receiver (destination FLA). The packet between the FLA node and the LGR uses FLAs.

Hereinafter, there will be explained a new geographical routing method in accordance with the present disclosure.

FIG. 14 is an explanatory diagram for explaining a geographical routing method in a network system in accordance with an illustrative embodiment.

Geographical routing algorithms are comprised of a location based routing (LBR), a topology based routing (TBR) in a wireless multi-hop network, and a gateway traversal routing (GTR) for Internet connectivity.

For the location based routing method, a greedy forwarding method is basically used by each node to transmit a packet to a destination. In this method, a node that receives a packet selects a neighbor node closer to the destination node than itself as the next hop and transmits the packet thereto.

However, the greedy forwarding method has a problem caused by a dead-end.

Figure 15:
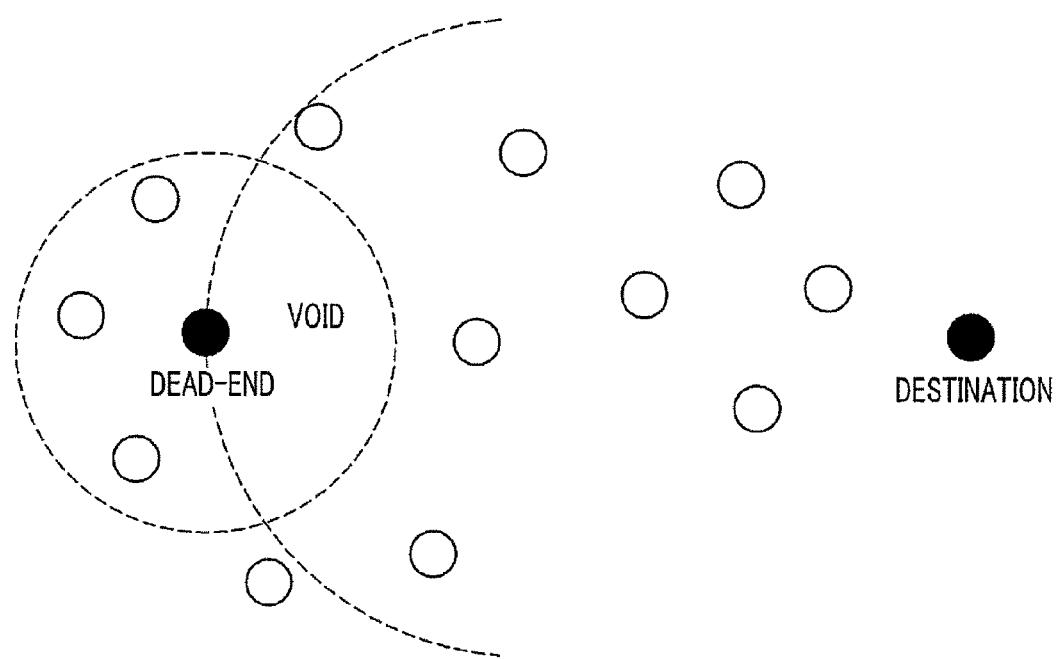
FIG. 15 is an explanatory diagram for explaining a problem of a greedy forwarding method.

FIG. 15 is an explanatory diagram for explaining a problem of a greedy forwarding method.

The greedy forwarding method does not operate when there is no neighbor node closer to the destination node than the current node. Such a node is called a dead-end node. And a situation where a packet isolated in a dead-end node is called void, hole or local-minimum.

In order to solve this problem, the present discloser improves the greedy forwarding method.

Figure 16:
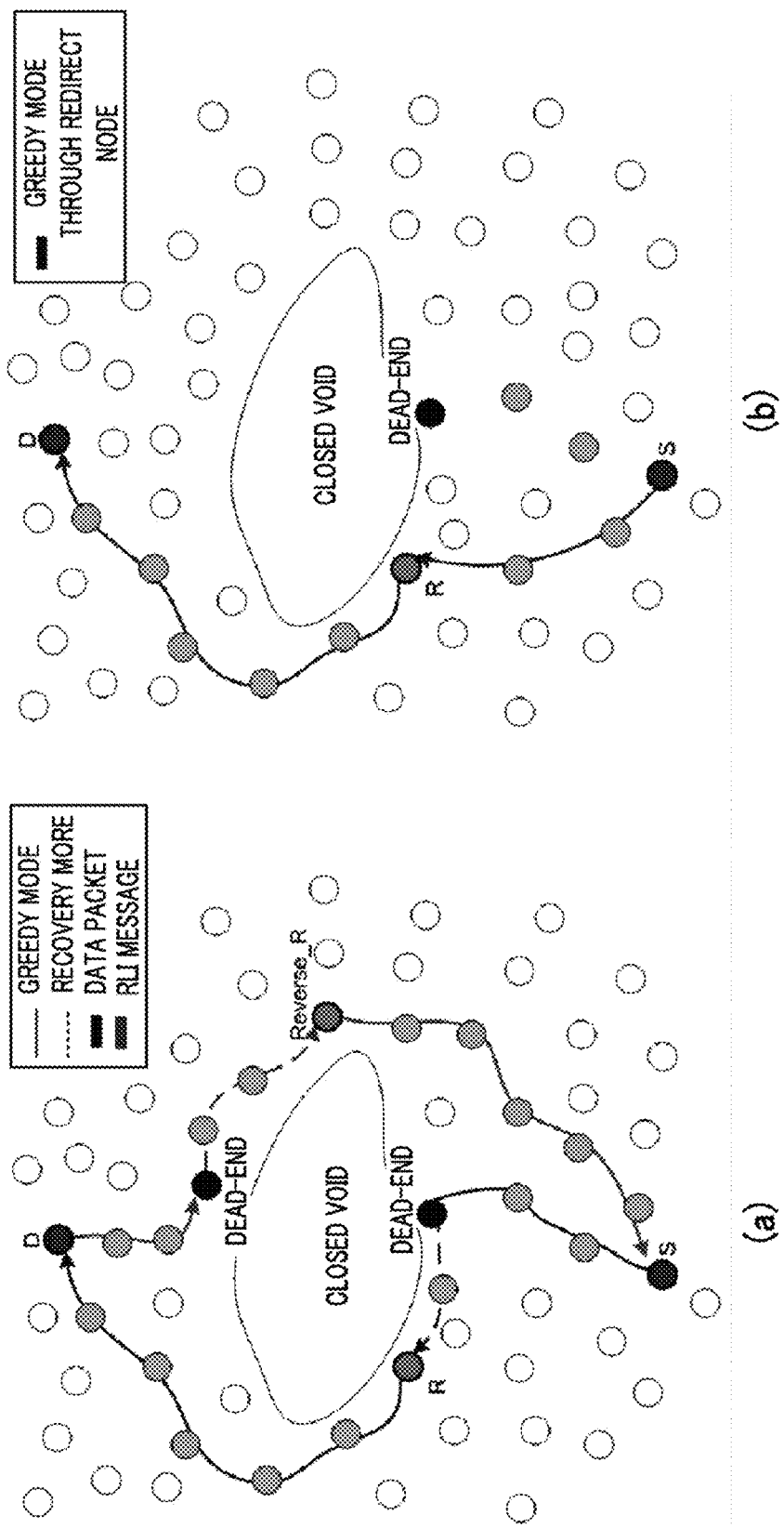
FIG. 16 is an explanatory diagram for explaining an improved greedy forwarding method in a network system in accordance with an illustrative embodiment.

FIG. 16 is an explanatory diagram for explaining an improved greedy forwarding method in a network system in accordance with an illustrative embodiment.

The route recovery or restoration mode of location based routing method starts from a dead-end node where the local-minimum problem occurred and a greedy forwarding is impossible to be performed. When a packet is isolated in the dead-end node, the dead-end node starts a route recovery mode such as a perimeter mode of GPSR (Greedy Perimeter Stateless Routing) (indicated by a dotted line in FIG. 16A). In the perimeter mode, the packet is continuously delivered according to a right hand rule. When the packet reaches a node closer to the destination than the starting point node of the perimeter mode, i.e. the dead-end node, the packet is delivered again in a greedy mode.

In the location based routing method, if an intermediate node that receives the packet is closer to the destination than the dead-end node, the intermediate node is called a redirect node. This redirect node records corresponding information in a redirect list field of a routing header of the packet and then restarts a greedy mode. If the packet that reaches the destination includes redirect node list information, the destination node transmits a control message such as a redirect list information (RLI) message including the redirect node list information to the source node. In case that this control message to the source node is isolated in the dead-end node, the intermediate node is called a reverse redirect node. This intermediate node records corresponding information in a redirect list field of the RLI message. In order to deliver the packet through a shorter route, the source node may select any one among routes including a route based on a forward route hop count from the source node to the destination node, and a route based on a reverse route hop count from the destination node to the source node. Therefore, as depicted in FIG. 16B, when delivering a subsequent packet to the same destination node, the source node may use the redirect routing header so as to avoid the dead-end node and deliver the packet through the redirect node. Thus, the local-minimum problem can be solved and the packet can be delivered successfully.

Now is explained the topology based routing. The location of the destination node is frequently changed in a wireless multi-hop network, and, thus, the source node may not know accurate location information of the destination node. Therefore, a routing loop may occur due to inaccurate location information of the destination node, and, thus, the location based routing method is not sufficient to deliver a packet. By regularly broadcasting a neighbor information (NI) message in one-hop range, each node can maintain local topology information in two-hop range. The NI message of a node includes information of the sender node and ID information of the node's neighbor nodes in one-hop range. If the source node or an intermediate node that transmits a packet is in two-hop range from the destination node, the source node or the intermediate node delivers the packet by using the local topology information instead of the location based routing method.

Such a topology based routing method can solve a routing loop problem occurring due to inaccurate location information of the destination node in a wireless multi-hop network.

Now is described the gateway traversal routing method for Internet access. Nodes a hop away from a gateway receive a router advertisement message from the gateway so as to maintain gateway information. Nodes two hops away from the gateway receive a NI message including a gateway list field from the nodes a hop away from the gateway. Nodes within a multi-hop network gradually recognize gateway information through NI messages regularly transmitted. Each node may set a global IP address by using gateway prefix information.

Each node that manages gateway information through a gateway list table compares prefix information of a gateway with prefix information of the destination node to determine whether the destination node is within the multi-hop network. If the destination node is an Internet node, the source node transmits a packet including a GTR header so as to make the packet be delivered through its basic gateway and each intermediate node transmits the packet to the gateway.

Hereinafter, there will be explained a concept of a geographical address system in accordance with another illustrative embodiment.

The geographical address system may have a length of 128 bits and include an address identifier field, a location information field, a range field, and an ID field.

The address identifier field is a field indicating that the address is a geographical information-based address. That is, the address identifier field stores an address identification code for showing that the address is different from a conventional IPv4 or IPv6 address.

It is virtually impossible to radically transform current networks into networks adopting the geographical address system. It can be done by following the example of transforming the conventional IPv4 networks into IPv6 networks, which shows that, with various transition mechanisms, the IPv4 networks are being gradually transformed into the IPv6 networks through a network transition stage in which the IPv4 networks and the IPv6 networks coexist.

Therefore, the geographical address system in accordance with embodiments of the present inventive concept may have 128 bits that is equal to the basic length of an IPv6 address so as to be applied to the IPv6 address system which is the next generation of IP address system.

With consideration for translation into and from the IPv6 address system, upper 8 bits of the address identifier field may identify whether or not the address is a geographical address. If the geographical address system is not universally used throughout different networks but only used in some particular networks, the geographical address may be translated into an IPv6 address (or an IPv4 address) in order to be provided with services in those networks that don't support the geographical address system.

During communication between heterogeneous networks having different address systems, the address identifier field can be used to determine whether or not there is a need to perform an address translation like the example of the IPv4/IPv6 translation mechanisms (ex: NAT-PT).

The location information field is a field that includes location information of the terminal.

The location information field may include latitude, longitude, and altitude as the location information of the terminal acquired by means of a GPS or the like. The latitude and longitude information is expressed using degrees, minutes, and seconds. The seconds may be rounded to the second decimal place.

The location information may be expressed with 8 bits. Latitude is divided into north and south, and represented in degrees, minutes, and seconds. Degrees are in a range from 0 to 90. Minutes vary in a range from 0 to 60. Seconds are in a range from 0 to 60, having two digits before the decimal point and two digits after the decimal point.

Longitude is divided into east and west, and represented in degrees, minutes, and seconds. Degrees are in a range from 0 to 180. Minutes are in a range from 0 to 60. Seconds are in a range from 0 to 60, and may have two digits before the decimal point and two digits after the decimal point. Altitude may be expressed with a height value followed by a unit. The height values vary in a range from 0 to 999, and the unit may be either m or km. The expression for the altitude information can be adjusted to be suitable for the applications using the geographical address system.

The location information may be acquired by the terminal by using a positioning system, such as a GPS, equipped in the terminal. If the terminal does not have any positioning system available or the positioning system cannot operate, the location information may be acquired from a reference point.

That is, since it is difficult for the terminal to acquire its location information by itself if the terminal is not equipped with a GPS receiver or the terminal is indoors, a method for setting a geographical address for a terminal that cannot acquire its own location information is needed.

Figure 17:
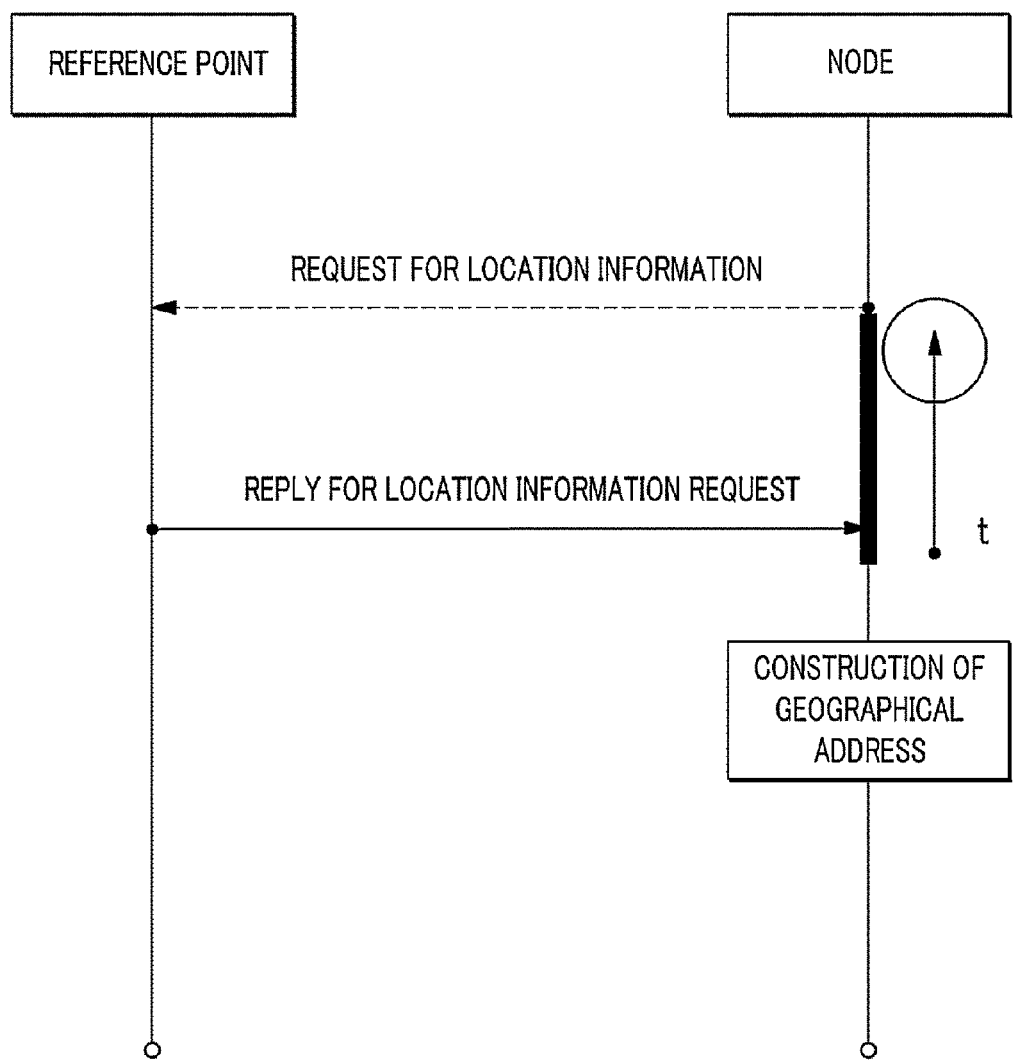
FIG. 17 illustrates a process of setting an address by acquiring location information from a reference point in accordance with an illustrative embodiment.

FIG. 17 shows a sequence of setting an address by means of acquiring location information from a reference point when location information of a terminal cannot be acquired by itself since there is no positioning system available thereto for setting the address or the positioning cannot operate.

Referring to FIG. 17, a terminal that cannot acquire its location information may transmit a location information request message to a reference point (for example, an access point), acquire the location information by receiving a location information reply message including location information of the reference point, and then set the geographical address by using the location information and its MAC address with others.

The location information may be acquired, when the terminal is in a multi-hop network environment. In this case, the location information can be acquired by means of a location information reply message received by the terminal from its neighboring nodes in response to the terminal's transmitting a location information request message to within one-hop range. If the location information reply message is not received within a certain time, it may be acquired by transmitting another location information request message with an extended transmission range of two or more hops.

Figure 18:
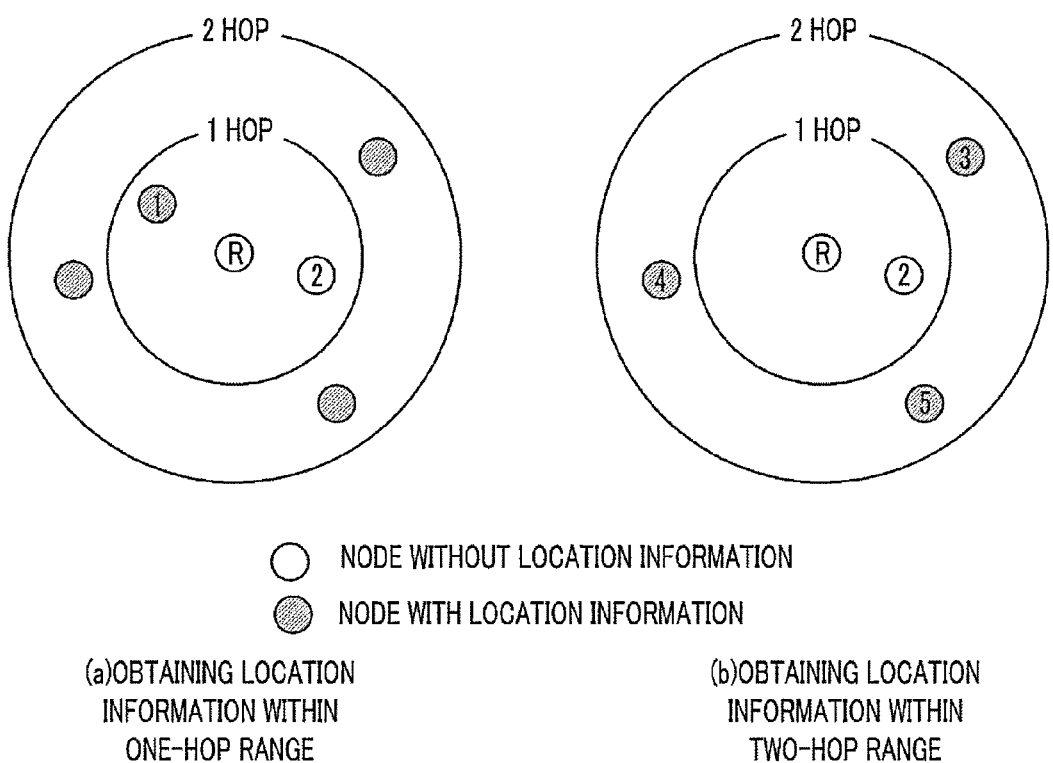
FIG. 18 is a configuration view for explaining a process of setting an address of a terminal which cannot measure location information in a wireless multi-hop network environment in accordance with an illustrative embodiment.
Figure 19:
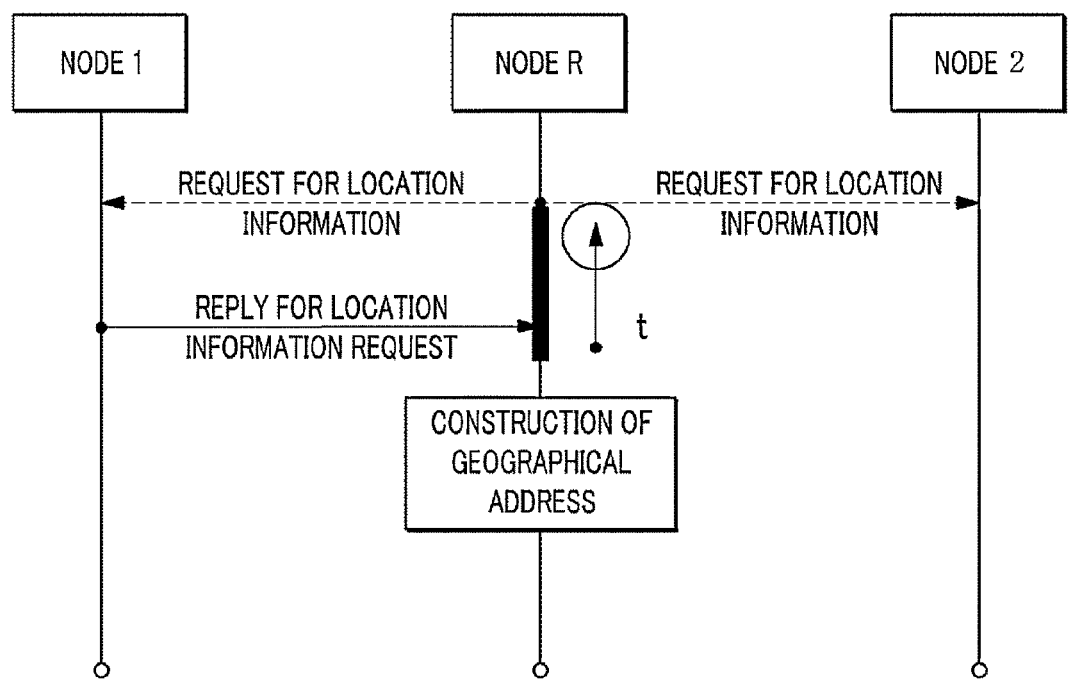
FIG. 19 is a flowchart of address setting within a one-hop range in a wireless multi-hop network environment in accordance with an illustrative embodiment.
Figure 20:
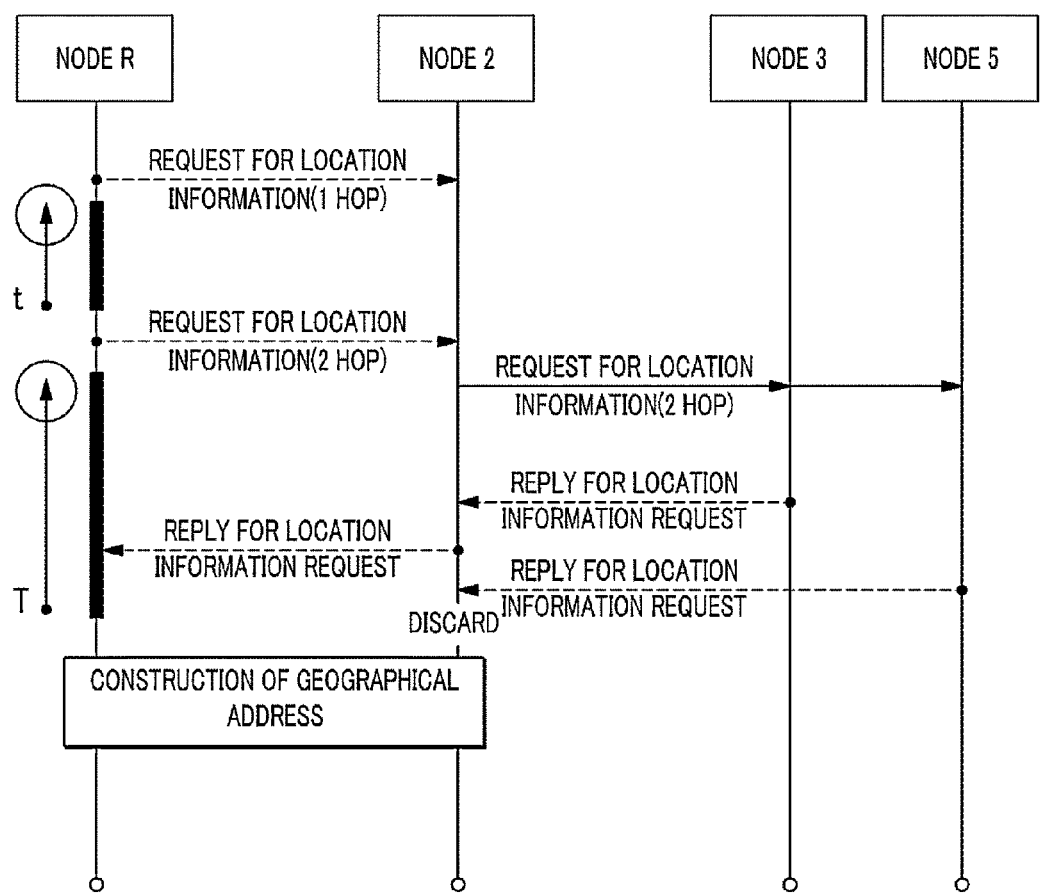
FIG. 20 is a flowchart of address setting within a two-hop range in a wireless multi-hop network environment in accordance with an illustrative embodiment.

FIG. 18 shows examples in which the terminal acquires location information from within a range of one hop and two hops, respectively. FIGS. 19 and 20 show sequences of the terminal setting its geographical address by acquiring the location information from within a range of one hop and two hops, respectively.

As depicted in FIG. 18 (left side) and FIG. 19, the terminal in the multi-hop network environment may transmit a location information request message to within one-hop range, and, using the location information reply message received from its neighboring nodes, set the geographical address.

If the location information reply message is not received before a certain time limit expires after the transmission of the location information request message, the terminal may transmit another location information request message with an extended transmission range of two or more hops, in consideration of the case that the neighboring nodes in one-hop range of the terminal may not have location information either.

As depicted in FIG. 18 (right side) and FIG. 20, since there is no terminal that has location information within one hop range, the terminal may extend the transmission range to two hops, and set the geographical address using the location information received from its neighboring nodes within two hops.

The range field may indicate whether the destination is a single destination or an area destination, and include the range information of the area destination in the case of an area destination. Having no value in the range field may indicate that the destination is a single destination, while a specific value therein may indicate that the destination is an area destination.

If the range field represents an area destination, the range of the area destination may be expressed based on the location information in the location information field. The area destination can be expressed in the form of a three-dimensional circle, a hexahedron, or a polygon.

The range field may be applied to the geographical address of the terminal's communication partner. If the communication partner is a single terminal (i.e. a single destination), there is no information expressed in the range field (i.e. there is no specific value included in the field). On the other hand, if the communication partner is not a single terminal, i.e. if a packet is transmitted to terminals in a specific area (geocast area), the range field may include the area (range) information for geocasting to transmit a packet to the specific area.

By way of example, if upper 2 bits of the range field have a value of 0, it may mean that the geographical address does not include a specific area (range) (i.e. it means a single destination). In this case, since the range field represents a single destination, the ID field does not need to express detailed area range information of the area destination, and therefore, a MAC address of the terminal may be stored in there.

If the upper 2 bits of the range field have a value of 1, it may mean that the geographical address represents the specific area (range) in the form of a circle. In this case, the range field may describe the specific area range by representing the radius of a circle from the center point stored in the location information field. The radius have values in a range from 0 to about 999 (10 bits), and m or km can be used for the unit.

Figure 21:
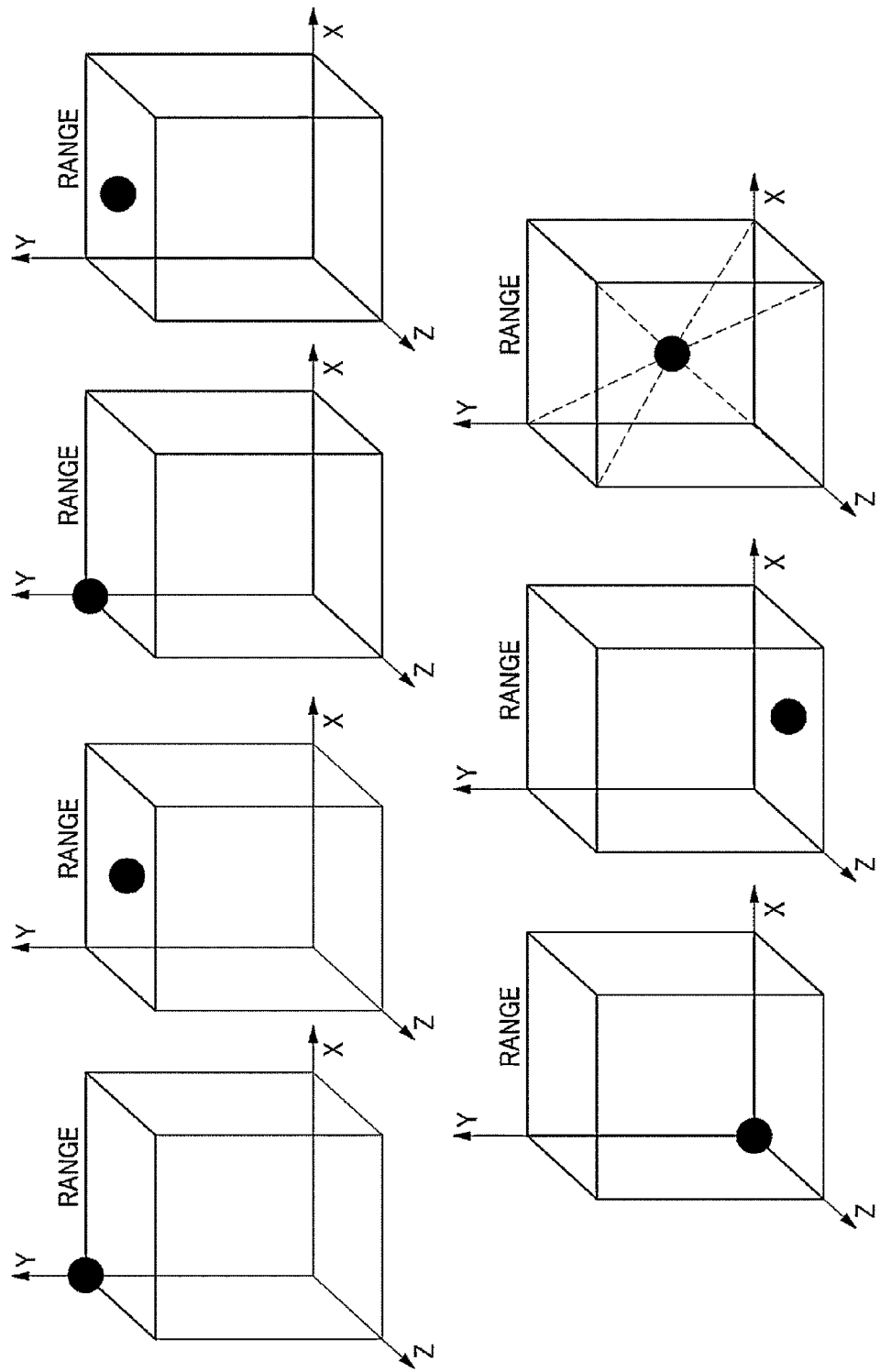
FIG. 21 an explanatory diagram illustrating a destination range represented as a cube by using a range field in accordance with an illustrative embodiment.
Figure 22:
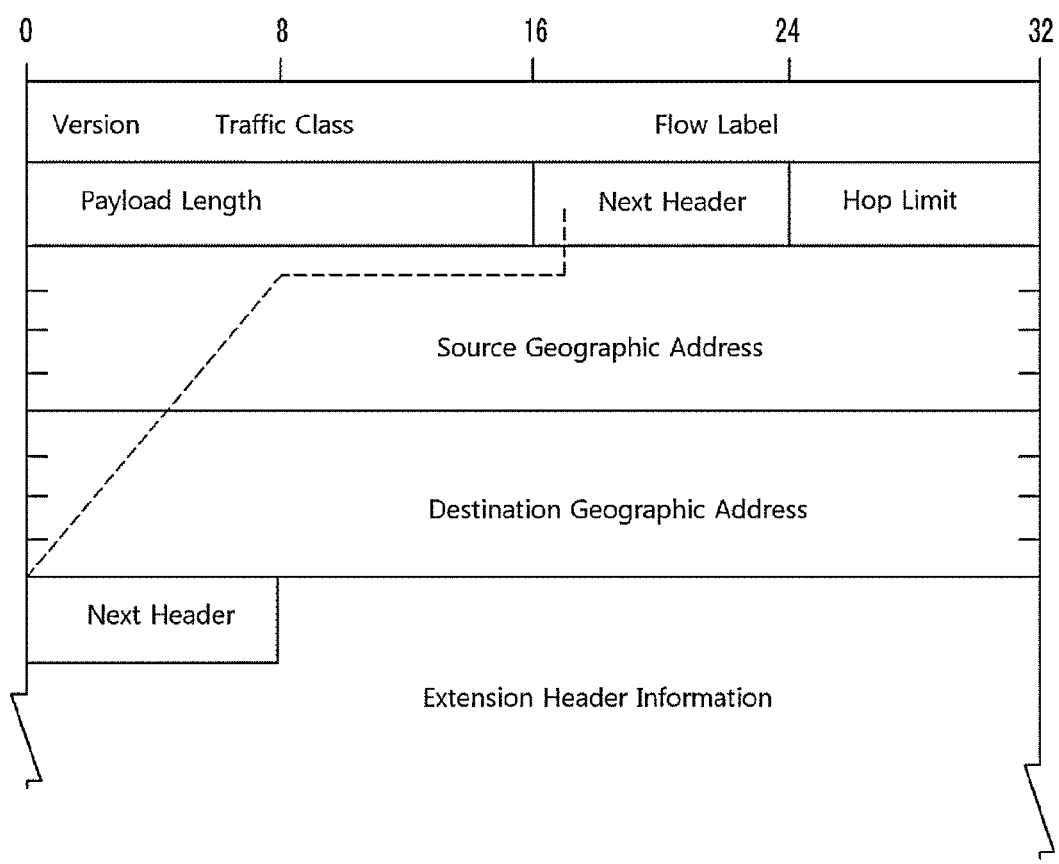
FIG. 22 is an explanatory diagram for expressing a geographical address in an IPv6 header in accordance with an illustrative embodiment.

The expression for the circle range can be adjusted to be suitable for the applications using the geographical address system. FIG. 21 shows an example where the specific area of the geographical address is expressed in the form of a circle.

If the upper 2 bits of the range field have a value of 2, it may mean that the geographical address represents the specific area (range) in the form of a rectangular parallelepiped. The range can be expressed in various ways depending on how and from what reference the point stored in the location information field is expressed.

For example, FIG. 21 shows that there can be various expressions depending on how the specific area (marked with bold lines) may be expressed with respect to the reference point (expressed as a ball). Information for expressing the specific area range is described in the ID field that represents detailed information of the area destination. If the ID field doesn't have enough space to represent the information, an IPv6 extension header can be used.

That is, the range of the area destination may be expressed in detail in the ID field. If not, it can be expressed by using IPv6 extension headers. Details thereof will be described below.

The ID field may include either the MAC address of the terminal or detailed information of the area range expressed in the range field. To be specific, if the destination is a single destination, the ID field may represent the MAC address of the terminal, and if the destination is an area destination, the ID field may represent detailed information of the area range expressed in the range field.

If the ID field is for the address of a single terminal (i.e. a single destination), the MAC (Media Access Control) address assigned to a network interface card of the terminal may be included in the ID field. The ID field including the MAC address may be used to distinguish terminals by their unique addresses even when there are some errors in information acquired from the positioning system (GPS or similar mechanisms) of the terminal.

On the other hand, if the address is for a specific area (i.e. an area destination), the ID field may include detailed information of the specific area (range) which couldn't be expressed in the range field due to the limited space of the range field. The specific area can be expressed in the form of a circle, a rectangular parallelepiped, or a polygon. If 48 bits of the ID field are not enough to express the specific area, one or more IPv6 extension headers may be used as depicted in FIG. 8.

IPv6 extension headers describe IPv6 header options and newly added functions to the IPv6 address system. For example, functions for communication are attached to the basic IPv6 header as a set of extension headers.

A packet may include a basic IPv6 header, and one or more extension headers in accordance with each communication need can be attached to the basic header. This configuration is used to increase the routing efficiency. Examples of IPv6 extension headers that have been defined so far include hop-by-hop options, routing, fragment, authentication, ESP (Encapsulating security payload), and destination options.

Details of the extension headers are as follows:

Table 1 below shows extension headers in the early days. All extension headers (except No. 59) have their own next header field. This configuration allows an IP address to attach multiple extension headers to it. The last extension header uses its next header field to point to a higher-level protocol.

TABLE 1

| IP Extension Header | |
|---|---|
| 0 | Hop-by-Hop Options Header |
| 43 | Routing Header |
| 44 | Fragment Header |
| 51 | Authentication Header |
| 59 | No Next Header |
| 60 | Destination Options Header |

Figure 23:
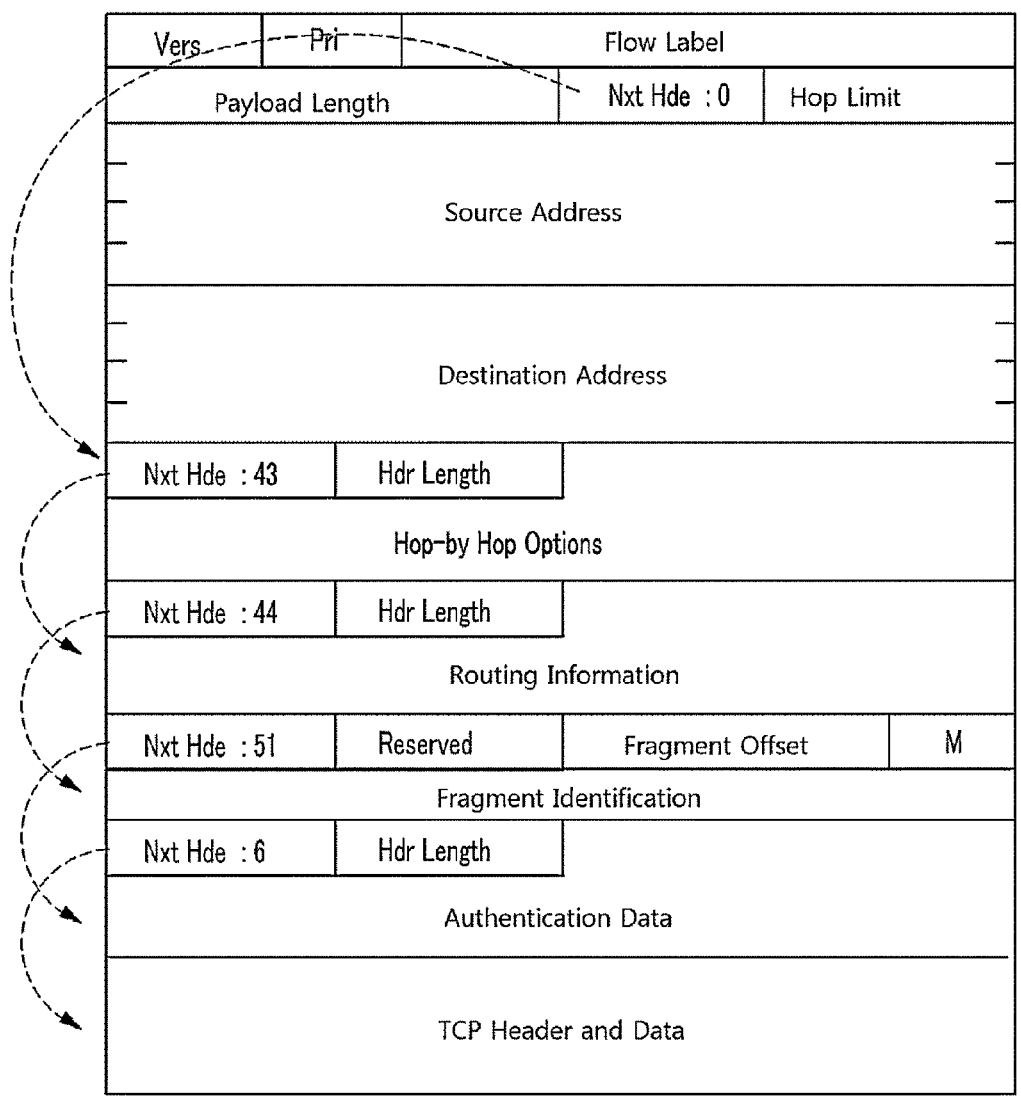
FIG. 23 illustrates a datagram including extension headers in accordance with an illustrative embodiment.

FIG. 23 shows a datagram including some extension headers. As depicted in FIG. 23, each header may designate its next header until the sequence reaches the authentication header whose next header field designates a higher-level protocol (TCP in this case).

Since the extension headers are not fixed in size, various types of IPv6 extension headers can be additionally developed. Therefore, if a basic geographical address (128 bits) doesn't have enough space to represent the area range information, an IPv6 extension header can be used to describe detailed information.

Meanwhile, a terminal that received a packet including the geographical address in accordance with the above-described method of setting a geographical address, may compare the location information, range, and ID field of the geographical address in the packet, and determine whether or not to receive the packet based on a result of the comparison.

For example, if the terminal that received the packet including the geographical address finds that the range field of the geographical address included in the received packet indicates a single destination, the terminal may receive the packet only when its MAC address is in agreement with the information included in the ID field.

If the terminal that received the packet including the geographical address finds that the range field of the geographical address included in the received packet indicates an area destination, the terminal may receive the packet only when the terminal is located in the range of the area destination defined by the range field and the ID field.

If no specific area is specified in the range field of the geographical address of the received packet, the packet's destination is a single node. Thus, the terminal may determine whether or not to receive the packet depending on whether or not the MAC address of the terminal is in agreement with the ID field of the address.

On the other hand, if a specific area is specified in the range field of the geographical address of the received packet, the terminal may determine whether or not to receive the packet by checking whether the location of the terminal is in the range of the specific area defined by the location information field and the range field.

The terminal which can automatically set its geographical address as described above may include a module for setting an address by acquiring the location information and the MAC address, a module for setting a relative address by designating a specific area as the address of the destination in a special case that a packet needs to be transmitted to the specific area, and a module for determining whether or not to receive a packet.

To be more specific, the terminal may include a location information receiving unit to acquire the location information of the terminal from a GPS or a similar mechanism equipped in the terminal. And if the terminal cannot acquire its location information by itself, the terminal may acquire the location information by sending a request message to a reference point asking for the location information of its surroundings and receiving a replay message from the reference point.

In accordance with embodiments of the present inventive concept, location information of the terminal can be acquired by parsing a data structure including address identifier field, location information field, range filed, and ID field. The location information of the terminal may include, for example, latitude, longitude, and altitude.

The terminal in accordance with embodiments of the present inventive concept may include a MAC address acquiring unit. The MAC address acquiring unit may acquire the MAC (Media Access Control) address information assigned to the network interface card of the terminal.

The terminal in accordance with embodiments of the present inventive concept may include a location range designating unit. If the terminal transmitting a packet wants the destination of the packet to include a specific area, the location range designating unit may calculate the range of the specific area based on the information acquired by the location information receiving unit and add the calculated range to the range information field of the data structure. However, if the address of the terminal represents a single terminal that does not include a specific area, there may be nothing to be processed by the location range designating unit.

The terminal in accordance with embodiments of the present inventive concept may include a geographical address setting unit. The geographical address setting unit may set an address in accordance with the geographical address system based on the information acquired by the location information receiving unit, the MAC address acquiring unit, and the location range designating unit.

The terminal in accordance with embodiments of the present inventive concept may include a packet acceptance determining unit. The packet acceptance determining unit may determine whether or not to receive a packet based on the destination address of the received packet. If the destination address of the packet includes a specific area, the packet acceptance determining unit may determine whether or not to accept the packet based on whether or not the terminal that received the packet is included in the specific area as a destination expressed in the location information field, the range field, and the ID field of the destination address.

If the destination address represents a single terminal instead of a specific area, the packet acceptance determining unit may determine whether or not to receive the packet based on whether or not the MAC address of the terminal is in agreement with the ID field information of the destination address.

The terminal in accordance with embodiments of the present inventive concept may include a relative location range designating unit and a relative address setting unit for the case that the destination of communication is a specific area instead of a single terminal. The packet acceptance determining unit in accordance with embodiments of the present inventive concept, based on the information in the address identifier field, may determine whether to proceed to an IP address information processing process or to a geographical address information processing process, and forward the received packet to the chosen process.

If the destination of the packet needs to be specified as terminals in a certain area, the relative location range designating unit may get the location range designating unit to specify the range of the destination area, and, based on this information, the relative address setting unit may set the destination address.

The above-described method of setting a geographical address has advantages including that an address can be automatically set based on the location information and the MAC address of a terminal. Although the IPv6 address system provides automatically setting of an address, it needs a router advertisement message containing a network prefix that should be received from a router, that is, an external terminal.

On the contrary, in accordance with embodiments of the present inventive concept, addresses can be automatically set without any help of routers or other external nodes, and, thus, it can be easier to establish a network. However, since the geographical address system in accordance with embodiments of the present inventive concept is expected to be employed in limited networks first, for supporting interconnectivity between a geographical address based network and an external network, a gateway that provides connectivity between the two networks may have functions as follows.

If a packet including the geographical address is transmitted to a network using the conventional IP address system, a gateway that connects networks using the geographical address system with networks using the conventional IP address system, may transmit the packet including the geographical address to the network using the conventional IP address system by performing an address translation.

After translating the geographical address into the conventional IP address, the gateway may store into a table the address before and after the translation of the terminal that transmitted the packet including the geographical address, and use the information stored in the table when determining the transmission destination of a packet received from the network using the conventional IP address.

The gateway that connects the network using the conventional IP address system with the network using the geographical address system may include a device configured to perform an address translation when a packet is transmitted to an external network so that communications between the two different networks can be carried out smoothly.

The gateway that forwards a packet transmitted by a terminal within a network using the geographical address system to an external network may translate the geographical address of the terminal into a global IP address suitable for the external network, and may store into a table the address before and after translation of the terminal transmitting the packet. Then, the gateway can use the information stored in this table to translate the destination address of a packet received from the communication partner terminal in the external network to forward the packet to the destination terminal in the geographical network.

The address translation of an address of an internal terminal into a global IP address performed by the gateway including the device for translating addresses can be applied to both the IPv4 address system and the IPv6 address system depending on the IP address system version of the external network connected to the gateway. If the counterpart terminal is a terminal using the IPv4 address system, the header of the packet may be translated to an IPv4 packet.

An illustrative embodiment can be applied to an IPv6 structure related to a future network technology, a switch and a routing device, a media gateway, an IMS, a soft switch, an application server, a firewall, and various ubiquitous computing devices. Further, an illustrative embodiment can be applied to not only all kinds of user terminals using various wired or wireless networks, such as a PC, a home appliance, a smart phone, an office applicance, a M2M, a smart grid, and a sensor network but also various network equipment constituting a network infra, and its application range can be extended continuously.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A network address generation device of a node, the network address generation device capable of generating a network address including:
   a flexible address including a locator that defines location information of a point where the node is located; and
   a node identifier that includes identification information of the node, wherein the network address of the node includes at least one or more of:

an addressing type field indicating an addressing type;

a mobile/fixed node flag indicating whether an interface connected to the node is mobile or fixed;

a backbone/local flag indicating whether the network address is used only in a local network or is also used in a backbone network;

bandwidth information indicating bandwidth information of the interface connected to the node;

CPU information indicating information of CPU performance of the node;

a virtual circuit flag indicating whether a virtual circuit is supported or not;

information of a virtual circuit range;

a virtual circuit label indicating a label used in a virtual circuit;

a node identifier including identification information of the node; and a locator indicating location information of the node.

2. The network address generation device of claim 1, wherein the locator includes an absolute locator including at least one or more of latitude, longitude, and altitude of the location of the node and area range information from an absolute location.

3. The network address generation device of claim 1, wherein the locator includes a relative locator including at least one or more of a distance of the node from a reference point and area range information of the node from the reference point.

4. The network address generation device of claim 1, wherein the flexible address includes a flexible local address used in a local network and a flexible global address used in a backbone network.

5. A data packet transmission method of a local global router, the data packet transmission method comprising:

(a) receiving, from a sending node, a data packet including a node identifier of the sending node, a node identifier of a destination node, a flexible local address of the sending node, and a flexible local address of a local global router included in the local network of the sending node; and (b) when the data packet is received, transmitting the data packet by setting a flexible global address of the local global router as the address of the sending node and a flexible global address of a local global router included in the local network including the destination node as the address of the receiving node.

6. The data packet transmission method of claim 5, further comprising:

(c) receiving the data packet transmitted in the step (b) by the local global router included in the local network of the receiving node; and (d) when the data packet is received, transmitting the data packet by setting a flexible local address of the local global router included in the local network of the receiving node as the address of the sending node and a flexible local address of the destination node as the address of the receiving node.

7. A flexible address management method comprising:

(a) receiving, from a node included in a local network served by a local global router, a registration request message of a flexible local address including a flexible local address of the node and node identification information of the node; and (b) in response to the registration request message of a flexible local address, storing a mapping relationship between the node identification information of the node and the flexible local address of the node in a mapping table by the local global router, wherein the flexible local address is generated based on a locator of the node and information of the local global router.

8. The flexible address management method of claim 7, wherein the locator includes an absolute locator including at least one or more of latitude, longitude, and altitude of the point where the node is located and area range information from an absolute location or a relative locator including at least one or more of a distance of the node from a reference point and area range information of the node from the reference point.

9. A flexible address management method using a database system, the flexible address management method comprising:

(a) receiving, from a local global router, a registration request message of a flexible global address including a flexible global address of the local global router and node identification information of a node included in a local network of the local global router; and (b) in response to the registration request message of a flexible global address, storing a mapping relationship between the node identification information of the node and the flexible global address of the local global router in charge of the local network including the node in a mapping table by the database system.

* * * * *